(12) United States Patent
Alakarhu et al.

(10) Patent No.: US 12,707,030 B2
(45) Date of Patent: Aug. 11, 2026

(54) FLEXIBLE RECORDING SYSTEMS AND BODY-WORN BATTERIES

(71) Applicant: Axon Enterprise, Inc., Scottsdale, AZ (US)

(72) Inventors: Juha Alakarhu, Tampere (FI); Mark J. Eastwood, Scottsdale, AZ (US); David Mesri, Scottsdale, AZ (US); Patrick W. Smith, Scottsdale, AZ (US); Nicholas R. Gilmour, San Jose, CA (US); Jason Hartford, Scottsdale, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 827 days.

(21) Appl. No.: 17/866,117

(22) Filed: Jul. 15, 2022

(65) Prior Publication Data

US 2022/0353478 A1 Nov. 3, 2022

Related U.S. Application Data

(63) Continuation of application No. 17/322,759, filed on May 17, 2021, now Pat. No. 11,399,159.

(Continued)

(51) Int. Cl.
*H04N 5/77* (2006.01)
*H04N 7/18* (2006.01)
(Continued)

(52) U.S. Cl.
CPC ............... *H04N 7/188* (2013.01); *H04N 5/77* (2013.01); *H04N 23/651* (2023.01); *H04N 23/90* (2023.01); *H04N 7/181* (2013.01)

(58) Field of Classification Search
None
See application file for complete search history.

(56) References Cited

U.S. PATENT DOCUMENTS 5,436,660 A 7/1995 Sakamoto
5,886,739 A 3/1999 Winningstad
(Continued)

FOREIGN PATENT DOCUMENTS

CN 109887205 * 6/2019
KR 10-2019-0087230 A 7/2019

OTHER PUBLICATIONS

Korean Intellectual Property Office, International Search Report for International Application No. PCT/US2021/032813 mailed Sep. 2, 2021.

(Continued)

*Primary Examiner* — Eileen M Adams
(74) *Attorney, Agent, or Firm* — Andrew Graham

(57) ABSTRACT

A recording system comprises an auxiliary recording device with a first camera and a (primary) recording device with a second camera. The recording device is configured to determine an activation event and to instruct at least one of the first camera to capture a first image or a second camera to capture a second image. Responsive to an image being captured, the recording device receives and stores the captured image. The recording system may comprise a body-worn battery configured to provide power to the recording system. The recording system may comprise a detachable body configured to detachably couple to a main housing body, wherein a camera of the detachable body is configured to capture images when coupled or when detached.

20 Claims, 8 Drawing Sheets

Related U.S. Application Data

(60) Provisional application No. 63/025,952, filed on May 15, 2020.

(51) Int. Cl.
*H04N 23/65* (2023.01)
*H04N 23/90* (2023.01)

(56) References Cited

U.S. PATENT DOCUMENTS 8,154,610 B2 4/2012 Jo et al.
8,493,482 B2 7/2013 Cote et al.
9,319,570 B2 4/2016 Sparidaens et al.
9,594,434 B1 3/2017 Neglur
10,054,845 B1 8/2018 Garcia et al.
10,085,545 B2 10/2018 Tran et al.
10,260,677 B1 4/2019 Catlin et al.
10,356,369 B2 7/2019 Yokomitsu et al.
2003/0137590 A1 7/2003 Barnes et al.
2006/0262194 A1 11/2006 Swain
2007/0070204 A1 3/2007 Mentzer
2012/0312651 A1* 12/2012 Kramer .............. B65H 75/4434 191/12.2 R
2015/0016035 A1* 1/2015 Tussy .................... G06F 1/1635 361/679.03
2015/0061576 A1* 3/2015 Chen ....................... B60L 53/31 320/108
2015/0316979 A1 11/2015 Onruang
2016/0241784 A1 8/2016 Baek et al.
2016/0286156 A1 9/2016 Kovac
2017/0018129 A1* 1/2017 Huebner ................. B60R 25/23
2017/0078561 A1 3/2017 Wang
2017/0133051 A1 5/2017 Mack et al.
2017/0163956 A1 6/2017 Lorenzetti
2017/0195635 A1 7/2017 Yokomitsu et al.
2017/0324897 A1 11/2017 Swaminathan et al.
2018/0090942 A1* 3/2018 Nunez ................... H02J 7/0045
2018/0129926 A1* 5/2018 Riedel .............. G06K 19/07372
2018/0234674 A1* 8/2018 Smith .................. H04N 23/698
2018/0249087 A1 8/2018 Arnold
2019/0230258 A1 7/2019 Phillips et al.
2020/0267326 A1 8/2020 Yim

OTHER PUBLICATIONS

European Patent Office, Extended European Search Report for European Application No. 21804983.1 mailed May 15, 2024.

* cited by examiner

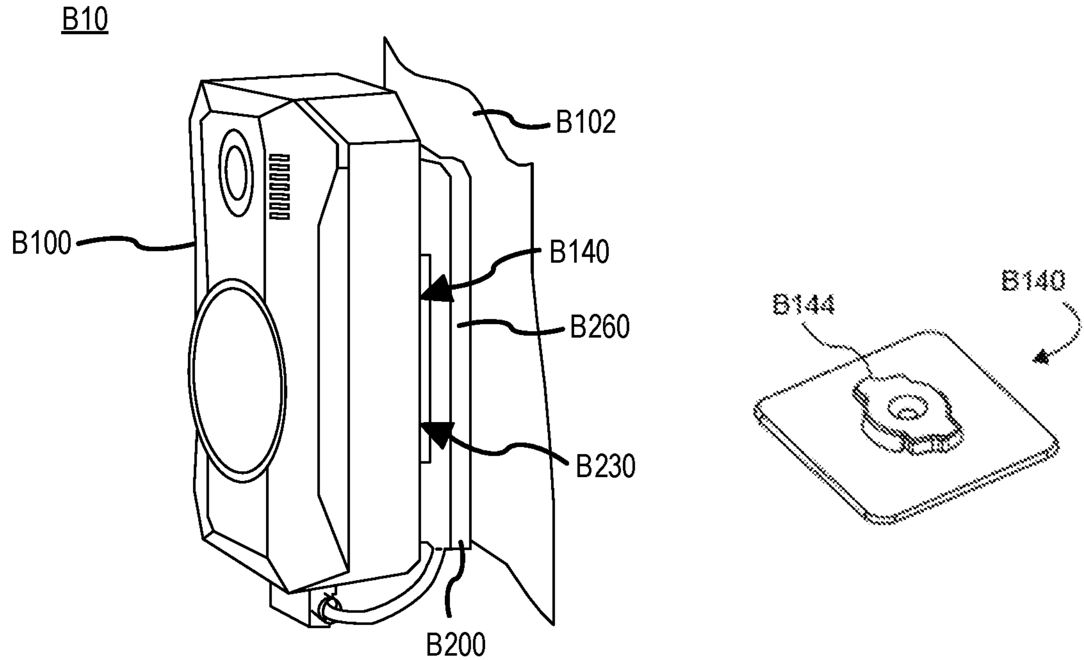
FIG. 6A
FIG. 6B
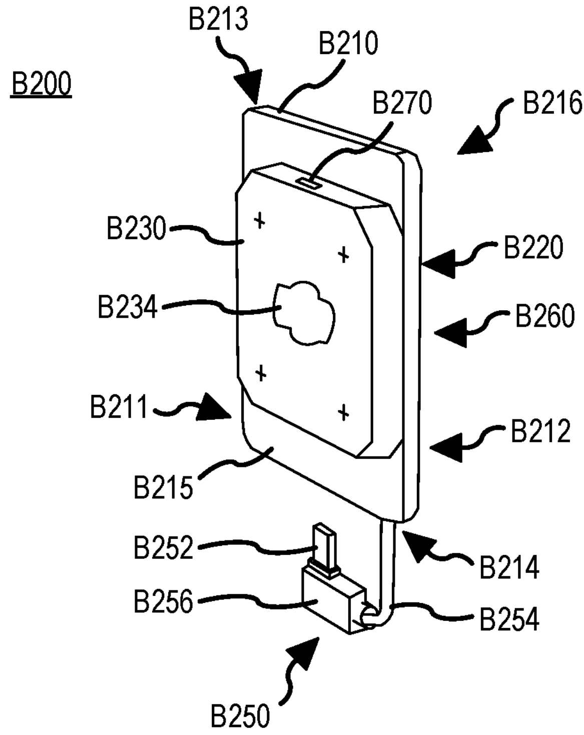
FIG. 7

FLEXIBLE RECORDING SYSTEMS AND BODY-WORN BATTERIES

CROSS-REFERENCE TO RELATED APPLICATIONS

This application is a continuation of U.S. patent application Ser. No. 17/322,759, filed on May 17, 2021, which claims the benefit of U.S. Provisional Application 63/025,952, filed May 15, 2020, each of which is incorporated by reference herein in its entirety.

FIELD OF INVENTION

Embodiments of the present invention relate to flexible camera systems and body-worn batteries that releasably mount to articles of wear.

BACKGROUND

Personnel such as law enforcement officers, first responders, firefighters, and recreationalists use cameras to capture events, so that a video and/or audio record exist of what happened in an incident. These cameras may be mounted on vehicles such as cars and drones, and they may also be worn on the body as body-worn cameras. Numerous mounting systems exist to mount cameras to personnel. These systems include a variety of coupling methods including those that utilize strong magnets, those that use adhesives, and those that use mechanical interlocks.

As the functionality of body-worn cameras and accessories advances, the power requirements of such devices may increase. The battery run-time of a body-worn camera should meet at least a length of the shift of the user. For example, the battery run-time of a body-worn camera should enable the camera to operate for at least 10 hours, at least 12 hours, or at least 14 hours. In some instances, the battery run-time of a body-worn camera may need to enable the body-worn camera or accessory to operate for as long as 24 hours or greater. Battery run-time requirements, functionality requirements, and size/ergonomic requirements play significant roles in the design of such cameras.

Mounts for body-worn cameras enable body-worn cameras to mount to a uniform of a user, such as a law enforcement officer. Body-worn cameras may be mounted at various locations on a user, each offering a unique perspective and field-of-view of the camera. An officer may choose to mount a body-worn camera at a particular location for a variety of reasons, such as ergonomics, ease of mounting, stability, and/or accessibility. In some instances, personnel use body-worn cameras while operating vehicles, such as police cars, fire trucks, ambulances, trucks, boats, helicopters, and the like. Due to the type of vehicle and the location of the body-camera on the user, a field-of-view of the body-worn camera may be obscured by controls of the vehicle, such as dashboards, displays, indicators, steering wheels, yokes, joysticks, and the like.

BRIEF DESCRIPTION OF THE DRAWINGS

FIG. 6A is a front perspective view showing an implementation of a body-worn battery system, according to some embodiments.

FIG. 6B is a top perspective view showing an implementation of a coupling feature, according to some embodiments.

FIG. 7 is a front perspective view showing an implementation of a body-worn battery, according to some embodiments.

Figure 1:
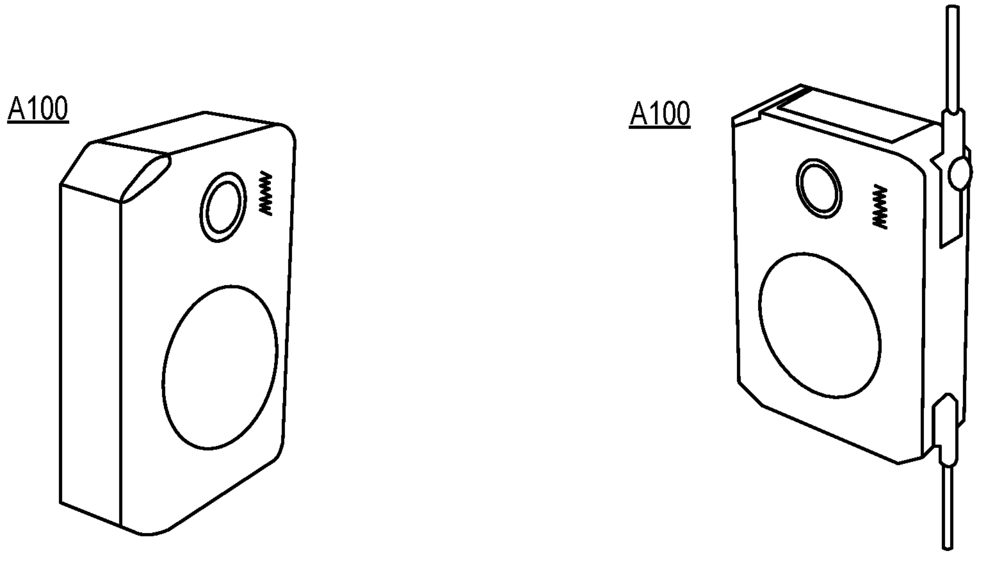
FIG. 1 shows an implementation of a recording device, according to some embodiments.
Figure 1:
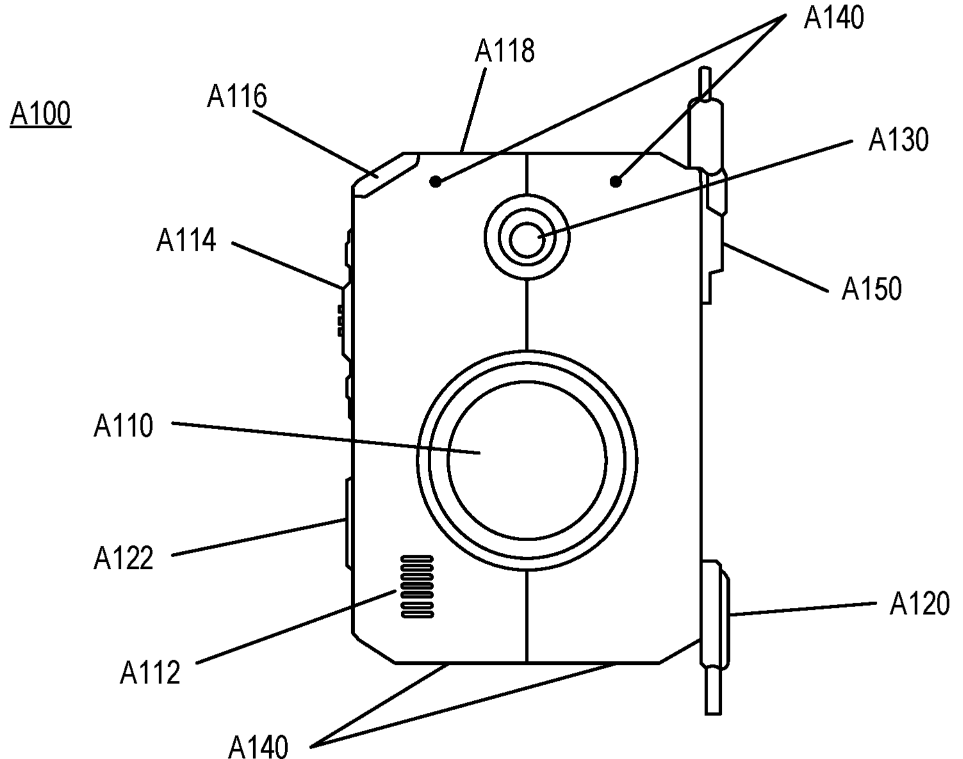

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

In various embodiments, an incident (or similar terms and phrases, such as an emergency) refers to human or animal activities and to a period of time while these activities take place. Incidents include, for example, formation of agreements, transactions, negotiations, discussions, ceremonies, meetings, medical procedures, sporting events, crimes, attempted crimes, disagreements, assaults, conflicts, discoveries, research, investigations, surveillance, and/or the like. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons. Incidents include information that may be valuable or otherwise important, helpful, or needed for risk management, insurance, claims, achievements, sports records, news reporting, entertainment, and/or the like.

One or more incident responders may respond or help before, during, or after an incident. For example, in response to an incident including a fire (e.g., burning building, house fire, etc.), incident responders may typically include a law enforcement officer, a firefighter, a medical responder (e.g., an emergency medical technician (EMT), a paramedic, an ambulance technician, etc.). As a further example, in response to an incident including a crime or attempted crime, incident responders may include one or more law enforcement officers.

Information (e.g., data, audio, visual, location, environmental, etc.) gathered about an incident may describe the incident. Information may include facts about the activities of the incident, consequences of the incident, time of the incident, location of the incident, and identity of humans, animals, or objects related to the incident. Information about an incident may form a report of an incident (e.g., an incident report). Information about the incident may be gathered before, during, or after an incident. Incident information may be recorded (e.g., audio, video) to document an incident at the time of occurrence.

Recording incident information captures at least some of the information about the incident. Recording further protects against loss of information, for example, by physical loss or by faulty human memory. For example, incident responders may capture audio and/or visual information of the incident. The audio and/or visual information may be captured by an incident recording device, such as, for example, a body-worn camera, a smart phone or internet of things (IoT) device, a vehicle-mounted camera, a surveillance camera, and/or any other recording device discussed herein.

Typical incident recording devices may capture incident information from a fixed position (e.g., a fixed field of view, a fixed vantage point, etc.). For example, a body-worn camera may capture a fixed position from the body of the incident responder, a vehicle-mounted camera may capture a fixed position from the vehicle, etc. The fixed position may include information that is not within the visual perspective (e.g., visual point of view) of the incident responder. The fixed position may not capture all information that is within the visual perspective of the incident responder.

Flexible Recording System

In various embodiments, and with reference to FIG. 1, a recording system is disclosed. The recording system may be configured to selectively capture incident information from a plurality of vantage points. For example, the recording system may be configured to capture incident information from a fixed field of view and a visual point of view configured to at least partially align with a point of view of the incident responder. In various embodiments, and as discussed further herein, the recording system may be configured to provide a plurality of interconnected recording devices, each recording device configured to capture incident information at a different vantage point. In various embodiments, and as discussed further herein, the recording system may comprise a single recording device comprising detachable components configured to capture incident information at different vantage points.

In various embodiments, a recording system may comprise a first housing and a second housing. The first housing may include a first recording device (e.g., an auxiliary recording device). The second housing may include a second recording device (e.g., a primary recording device). The first housing may capture incident information independent of the second housing. The second housing may capture incident information independent of the first housing. The first housing and the second housing may cooperate to capture incident information. The second housing may instruct the first housing to capture incident information.

The first housing may capture a first image and the second housing may capture a second image. The first image may contain first captured data and the second image may contain second captured data. The first captured data may be at least partially the same as the second captured data (e.g., the first image and the second image may each capture the same incident information from different points of view). The first captured data may be at least partially different than the second captured data (e.g., the first image may capture incident information that the second image did not capture, the second image may capture incident information that the first image did not capture, etc.).

In various embodiments, and with reference to FIG. 1, an exemplary recording device A100 is disclosed (e.g., the second housing, the primary recording device, etc.). Recording device A100 may comprise any suitable device configured to capture incident information. For example, recording device A100 may comprise a body-worn camera, a smart phone, or the like.

Recording device A100 may comprise a body A105 (e.g., housing) defining an outer surface of recording device A100. Body A105 may comprise mechanical features configured to couple recording device A100 to a surface. Body A105 may be configured to couple (e.g., mount) to a user. For example, the mechanical features may be configured to interface with an article of clothing or a mount assembly on a user. Body A105 may mount to a location on the user (e.g., a mount location, a second location, etc.). For example, body A105 may mount to a belt mount, a chest mount, or a shoulder mount (e.g., as variously depicted in FIG. 2) on the user. In response to being mounted to the location on the user, recording device A100 may be positioned to capture incident information at a fixed position relative to the user. In other embodiments, body A105 may also be configured to mount on or in a vehicle or similar platform.

In various embodiments, body A105 may be configured to house (fully and/or at least partially) various mechanical, electrical, and/or electronic components configured to aid in performing the functions of recording device A100.

For example, and in accordance with various embodiments, body A105 may be configured to house (fully and/or at least partially) an image capturing system A130, an audio capturing system A140, and/or an auxiliary connection port A150. As a further example, and in accordance with various embodiments, body A105 may be configured to house (fully and/or at least partially) a user interface A110, an audio output system A112, an audio output volume control A114, a communications interface A116, a display A118, a power charging port A120, a power switch A122, and/or the like. As a further example, and in accordance with various embodiments, body A105 may be configured to house various internal electronic components such as a processor, a memory, a network interface, a power supply, and/or the like.

In various embodiments, the processor may comprise any circuitry, electrical components, electronic components, software, and/or the like configured to perform various operations and functions discussed herein. For example, the processor may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, the processor may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, the processor may include data buses, output ports, input ports, timers, memory, arithmetic units, and/or the like.

The processor may be configured to provide and/or receive electrical signals whether digital and/or analog in form. The processor may provide and/or receive digital information via a data bus using any protocol. The processor may receive information, manipulate the received information, and provide the manipulated information. The processor may store information and retrieve stored information. Information received, stored, and/or manipulated by the processor may be used to perform a function, control a function, and/or to perform an operation or execute a stored program.

The processor may control the operation and/or function of other circuits and/or components of recording device A100. The processor may receive status information regarding the operation of other components, perform calculations with respect to the status information, and provide commands (e.g., instructions) to one or more other components. The processor may command another component to start operation, continue operation, alter operation, suspend operation, cease operation, or the like. Commands and/or status may be communicated between the processor and other circuits and/or components via any type of bus (e.g., SPI bus) including any type of data/address bus.

In various embodiments, the processor may be in electrical, electronic, and/or mechanical communication with one or more components of recording device A100. For example, the processor may be in communication with the memory, the network interface, the power supply, image capturing system A130, audio capturing system A140, user interface A110, audio output system A112, audio output volume control A114, communications interface A116, display A118, power switch A122, and/or the like.

In various embodiments, the memory may comprise one or more memory, data structures, or the like configured to store data, programs, and/or instructions. The memory may be in electrical and/or electronic communication with the processor, the network interface, image capturing system A130, audio capturing system A140, and/or any other suitable component of the recording device.

In an embodiment, the memory may comprise a tangible, non-transitory computer-readable memory. Instructions stored on the tangible non-transitory memory may allow the processor to perform various operations, functions, and/or steps, as described herein. For example, in response to the processor executing the instructions on the tangible non-transitory memory, the processor may communicate with image capturing system A130 and/or audio capturing system A140 to capture image and/or audio data, end capturing of the image and/or audio data, and/or the like, as discussed further herein. As a further example, in response to the processor executing the instructions on the tangible non-transitory memory, the processor may communicate with an auxiliary recording device, via the network interface., to capture image and/or audio data, end capturing of the image and/or audio data, and/or the like, as discussed further herein. The processor may execute the instructions in response to operation of user interface A110, as discussed further herein. In an embodiment, the memory may also be configured to receive, store, and maintain incident recordings, including captured image and audio data. In that regard, the memory may include a storage medium, data structure, database, memory unit, hard-disk drive (HDD), solid state drive (SSD), removable memory, and/or the like.

In various embodiments, the network interface may be configured to enable the transmission and/or reception of data between recording device A100 and one or more additional devices, servers, networks, or the like. For example, the network interface may be configured to enable the transmission and/or reception of data between recording device A100 and an auxiliary recording device. The network interface may be in electric and/or electronic communication with the processor and/or the memory. The network interface may comprise one or more suitable hardware and/or software components capable of enabling the transmission and/or reception of data, such as, for example, a communications unit, a transmitter, and/or a receiver as discussed further herein. In various embodiments, recording device A100 may only have a receiver configured to receive data (e.g., images, video, etc.) from an auxiliary recording device. In various embodiments, recording device A100 may have a transmitter and a receiver to transmit data (e.g., instructions) to and receive data (e.g., images, video, etc.) from an auxiliary recording device.

In various embodiments, the power supply (e.g., power source) may be configured to provide power to one or more electric and/or electronic components of the recording device. In various embodiments, the power supply may also be configured to provide power to an auxiliary recording device, such as, for example, via auxiliary connection port A150. The power supply may provide energy for operating electronic and/or electrical components (e.g., parts, subsystems, circuits, etc.). The power supply may provide electrical power. The power supply may include a battery. The energy of the power supply may be renewable or exhaustible, and/or replaceable. For example, the power supply may comprise one or more rechargeable or disposable batteries. In response to the power supply comprising one or more rechargeable batteries, the power supply may be in electric communication with power charging port A120. Power charging port A120 may allow recording device 100A to receive electrical power from an external source to charge the power supply.

In various embodiments, provision of power from the power supply may be controlled by power switch A122 and/or the processor. For example, the power switch may be depressed, translated, or otherwise operated to activate (e.g., turn on) or deactivate (e.g., turn off) recording device A100. In various embodiments, the processor may also monitor and/or record a power level or remaining power of the power supply. The processor may compare the power level or the remaining power of the power supply to a power threshold, and perform one or more operations based on the comparison. For example, in response to the power supply having a low power level or remaining power, the processor may instruct various components of recording device A100 and/or an auxiliary recording device to enter a low power mode. Alternatively, the processor may instruct the power supply to cease providing power to the various components of recording device A100 and/or the auxiliary recording device. In various embodiments, in response to the remaining power being less than or equal to the power threshold, the processor may instruct the auxiliary recording device to no longer capture incident information (e.g., images). In various embodiments, in response to the remaining power being less than or equal to the power threshold, the processor may instruct the auxiliary recording device to record images at a lower quality setting (e.g., capture lower resolution images). The power threshold may comprise any suitable and/or desired battery level (e.g., 10%, 20%, etc.).

In various embodiments, image capturing system A130 may be configured to capture an image or series of images (e.g., video). For example, during an incident recording image capturing system A130 may be configured to capture an image or series of images of the incident recording. Image capturing system A130 may comprise various hardware and/or software components configured to capture images and/or video. For example, image capturing system A130 may comprise one or more cameras configured to capture images and/or video. Each camera may comprise a camera lens or plurality of camera lenses. A camera may comprise a narrow angle field of view camera, a wide angle field of view camera, and/or the like.

Image capturing system A130 may be in electric and/or electronic communication with the processor and/or the memory. The processor may control (e.g., instruct) image capturing system A130 to begin capturing images and to end capturing of the images. The processor may also control (e.g., instruct) image capturing system A130 to transmit the captured images to the memory for storage. Image capturing system A130 may transmit (e.g., stream) the captured images to the memory as the images are captured or in response to image capturing system A130 ending capturing of the images.

In various embodiments, a recording device may not comprise an image capturing system. In that regard, in order to capture images of an incident the recording device may communicate with an auxiliary recording device configured to capture images.

In various embodiments, audio capturing system A140 may be configured to capture audio data. For example, during an incident recording audio capturing system A140 may be configured to capture audio data of the incident recording. Audio capturing system A140 may comprise various hardware and/or software components configured to capture audio. For example, audio capturing system A140 may comprise one or more microphones configured to capture audio data. Each microphone may be located at any suitable or desired position on recording device A100 or body A105. Audio capturing system A140 may be in electric and/or electronic communication with the processor and/or the memory. The processor may control (e.g., instruct) audio capturing system A140 to begin capturing audio data and to end capturing of the audio data. The processor may also control (e.g., instruct) audio capturing system A140 to transmit the captured audio data to the memory for storage. Audio capturing system A140 may transmit (e.g., stream) the captured audio to the memory as the audio data is captured or in response to audio capturing system A140 ending capturing of the audio data. In various embodiments, audio capturing system A140 may begin and end capturing of the audio data at the same time, or near the same time, as image capturing system A130 begins and ends capturing of images.

In various embodiments, a recording device may not comprise an audio capturing system. In that regard, in order to capture audio of an incident the recording device may communicate with an auxiliary recording device configured to capture audio, or may integrate or communicate with an external microphone, audio capturing device, or the like.

In various embodiments, user interface A110 may be configured to enable a user to interact with recording device A100. For example, user interface A110 may be configured to enable the user to control operation of recording device A100 and/or an auxiliary recording device, including starting and stopping recording of audio data and/or image data. User interface A110 may be in electrical, electronic, and/or mechanical communication with the processor.

User interface A110 may comprise any suitable hardware, software, mechanical, and/or electronic components configured to enable the user interaction. For example, and in accordance with various embodiments, user interface A110 may comprise a button, switch, or the like. In that regard, user A110 240 may be configured to move, slide, rotate, or otherwise become physically depressed or translated upon application of physical contact. As a further example, and in accordance with various embodiments, user interface A110 may comprise a touchscreen or similar interface enabling user input. As a further example, and in accordance with various embodiments, user interface A110 may include voice control technology. In that regard, user interface A110 may at least partially integrate with audio capturing system A140 to receive voice commands (e.g., "Record", "Stop Record", "Capture Image", "Record Audio", etc.). Voice command technology is known in the art, and user interface A110 may implement any suitable voice command technology.

In various embodiments, in response to user interface 240 receiving an activation event (e.g., physically activation, voice activation, touch-screen selection or activation, etc.), the processor may be configured to perform various operations including starting and/or stopping an incident recording, controlling operation of image capturing system A130, controlling operation of audio capturing system A140, controlling operation of an auxiliary recording device, and/or the like, as discussed further herein. For example, in response to user interface A110 of recording device A100 receiving the activation event, the processor may determine or detect the activation event and instruct image capturing system A130 to capture an image or series of images. The processor may also instruct audio capturing system A140 to capture audio data. As a further example, in response to user interface A110 of recording device A100 receiving the activation event, the processor may determine or detect the activation event and instruct image capturing system A130 to capture an image or series of images and instruct an auxiliary recording device to also capture an image or series of images. The processor may also instruct audio capturing system A140 to capture audio data. In various embodiments, the processor may be configured to detect whether an auxiliary recording device is in communication with recording device 100 before instructing the auxiliary recording device to capture an image or series of images. In response to determining that an auxiliary recording device is not in communication with recording device 100, the processor may only instruct image capturing system A130 to capture an image or series of images.

In various embodiments, user interface A110 may include an authorization control configured to control access and operation of recording device A100. For example, user interface A110 may comprise a biometric authorization control, such as a fingerprint reader, configured to control access and operation of recording device A110. Authorization controls and biometric authorization controls are well known in the art, and user interface A110 may implement any suitable authorization control technology and/or biometric authorization technology.

In various embodiments, communications interface A116 may be configured to enable communications between a user of recording device A100 and at least a second user. For example, communications interface A116 (together with the processor, the network interface, and other components of recording device A100) may be configured to enable communications between users via a communications channel. The communications channel may be private or public. The enabled communications may include push-to-talk (PTT) communications, two-way communications, and/or the like. The communications channel may include a telecommunications network (e.g., a telephonic communication). The telecommunications network may include a public switched telephone network (PSTN), a cellular network or mobile network, a private telephone network (e.g., a private branch exchange (PBX)), an integrated services digital network (ISDN), and/or the like. For example, in a PTT communication a user may operate communications interface A116 to transmit a verbal message (e.g., an audio message).

Audio output system A112 may be configured to output audio from recording device A100. For example, audio output system A112 may be configured to output audio from a communication with a second user or device. Audio output system A112 may comprise hardware and/or software configured to output the audio. For example, audio output system A112 may comprise a speaker or plurality of speakers. Operations between communications interface A116 and audio output system A112 may be controlled by the processor.

Audio output volume control A114 may be configured to control (e.g., increase, decrease) a volume of sound output from audio output system A112. Audio output volume control A114 may comprise a button, switch, touchscreen interface, or the like configured to control a volume of sound output from audio output system A112. In response to operation of audio output system A112, the processor and/or audio output system A112 may control the volume of sound output from audio output system A112 accordingly.

In various embodiments, display A118 may be configured to visually display data regarding recording device A100, an auxiliary recording device, and/or an incident recording. Display 118 may comprise an LCD screen, output device, or the like configured to visually display data. Operation of display 118 may be at least partially controlled by the processor. For example, display A118 may be configured to display data such as a recording device battery level, an auxiliary recording device battery level, a date, a time, an incident recording status (e.g., recording, paused, etc.), an incident recording length (e.g., an elapsed time of the incident recording), an incident recording start time, or the like.

In various embodiments, auxiliary connection port A150 may be configured to prove a wired electronic communication between recording device A100 and an auxiliary recording device. The wired electronic communication may include the transmission of data to and from the devices. The wired electronic communication may include the transmission of power from recording device A100 to the auxiliary recording device. In various embodiments, auxiliary connection port A150 may comprise an industry-standard connector for transmitting both data and power on a single cable, such as, for example, a USB Type-C connection port. In various embodiments, auxiliary connection port A150 may comprise a proprietary connector for transmitting data and power to an auxiliary recording device. The proprietary connector may transmit both data and power on a single cable. The proprietary connector may have a separate power cable and a separate data cable configured to provide the transmissions. In various embodiments, auxiliary connection port A150 may also provide power and/or data transmission via a wireless transmission, such as, for example, through inductive coupling.

Figure 2:
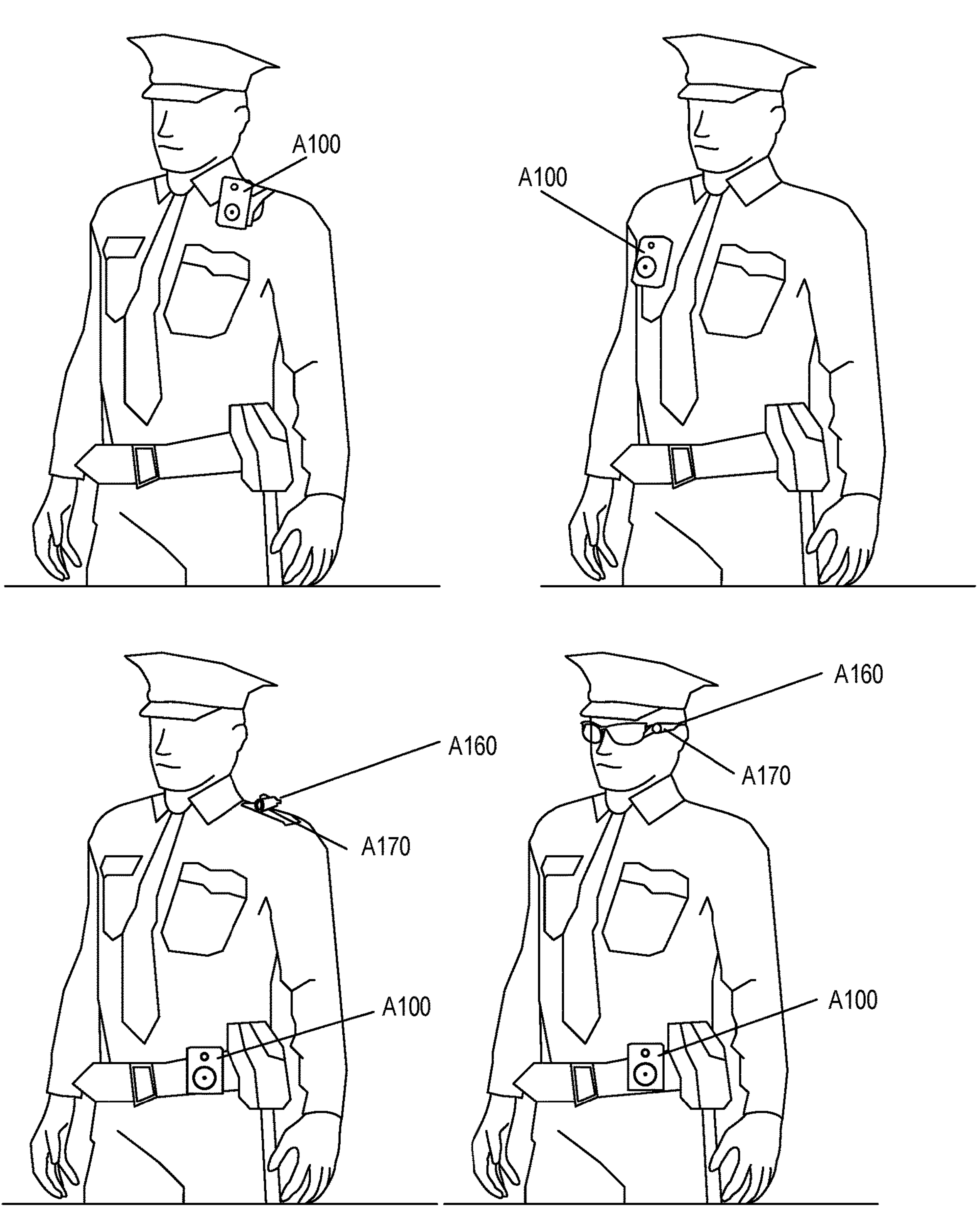
FIG. 2 shows implementations of recording devices and auxiliary recording devices mounted at various positions on a user, according to some embodiments.
Figure 3:
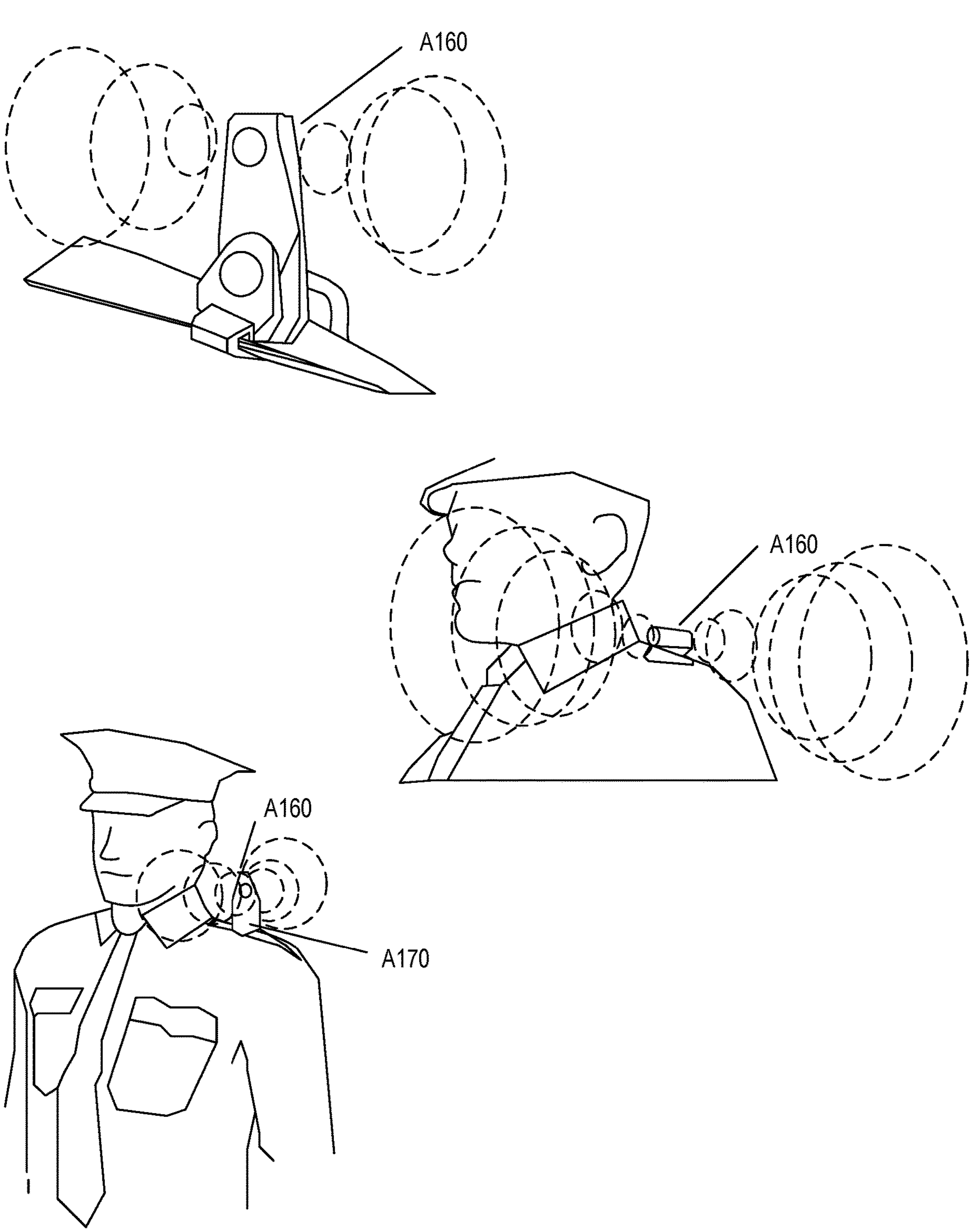
FIG. 3 shows implementations of auxiliary recording devices, according to some embodiments.

In various embodiments, and with reference to FIGS. 1, 2, and 3, an auxiliary recording device A160 is disclosed (e.g., the first housing, the secondary recording device, etc.). Auxiliary recording device A160 may be configured to cooperate with a (primary) recording device to capture an image or a series of images. Auxiliary recording device A160 may comprise any suitable device configured to capture incident information in cooperation with a (primary) recording device.

Auxiliary recording device A160 may comprise a body (e.g., an auxiliary body, an auxiliary recording device body, the first housing, etc.) defining an outer surface of auxiliary recording device A160.

The body of auxiliary recording device A160 may comprise mechanical features configured to couple auxiliary recording device A160 to a surface. The body may be configured to couple (e.g., mount) to a user. For example, the mechanical features may be configured to interface with an article of clothing or a mount assembly on a user. The body may mount to a location on the user (e.g., a mount location, a first location, etc.). For example, the body may mount to a chest mount, a shoulder mount, an eyewear mount, an earpiece mount, or a lapel mount (e.g., as variously depicted in FIGS. 2 and 3). In various embodiments, the body may integrate with an article of clothing at the first location on the user. For example, the body may integrate with or into eyewear mount or an earpiece mount. In response to being mounted to (or integrated into) the location on the user, auxiliary recording device A160 may be positioned to capture incident information to at least partially align with (or simulate) a visual point of view of the user. In various embodiments, auxiliary recording device A160 may be configured to rotatably mount to the first location on the user.

As a further example, and in accordance with various embodiments, the body of auxiliary recording device A160 may comprise mechanical features or other features configured to enable auxiliary recording device A160 to mount to a different location not on a user. For example, the body may comprise a magnet configured to enable the body to removably couple to a metallic surface, such as a surface of a vehicle, a metal pole, an other metal surface, a shield, a helmet, a drone (e.g., a body of a drone), and/or the like. The body may also comprise a universal mount such as a clip, a grip, or the like configured to allow the body to fixably couple to an edge surface of an object.

In various embodiments, the body of auxiliary recording device A160 may be configured to house (fully and/or at least partially) various mechanical, electrical, and/or electronic components configured to aid in performing the functions of auxiliary recording device A160. For example, and in accordance with various embodiments, the body of auxiliary recording device A160 may be configured to house (fully and/or at least partially) an image capturing system A170 (e.g., an auxiliary image capturing system). As a further example, and in accordance with various embodiments, the body of auxiliary recording device A160 may be configured to house (fully and/or at least partially) a user interface, a network interface, a power supply, and/or the like. In various embodiments, auxiliary recording device A160 may comprise a memory configured to buffer or temporarily store images before transmission to a (primary) recording device. The memory may comprise any type of memory described herein.

In various embodiments, image capturing system A170 may be configured to capture an image or series of images (e.g., video). For example, during an incident recording image capturing system A170 may be configured to capture an image or series of images of the incident recording. Image capturing system A170 may comprise various hardware and/or software components configured to capture images and/or video. For example, image capturing system A170 may comprise one or more cameras configured to capture images and/or video. Each camera may comprise a camera lens. A camera may comprise a narrow angle field of view camera, a wide angle field of view camera, and/or the like.

In various embodiments, a camera may comprise a plurality of camera lenses (e.g., a multi-lens camera). For example, a camera may comprise a forward capture lens configured to capture images at least partially forward the user, and a rearward capture lens configured to capture images at least partially rearward the user. A camera may also comprise one or more side or profile capture lenses configured to capture images peripheral the user. A processor of the camera may coordinate with the plurality of camera lenses to capture images at a same time, or near same time.

In various embodiments, image capturing system A170 may comprise an omnidirectional camera. The omnidirectional camera may be configured to capture a 360 degree field of view relative to the body of auxiliary recording device A160. The omnidirectional camera may comprise a camera lens having a 360 degree field of view, or a plurality of camera lenses enabling a 360 degree field of view. The omnidirectional camera may be configured to output images and/or series of images as monoscopic video or stereoscopic video.

In various embodiments, image capturing system A170 may comprise an infrared camera. The infrared camera may comprise any suitable infrared camera, including short wavelength infrared (SWIR), medium wavelength infrared (MWIR), and/or long wavelength infrared (LWIR). The infrared camera may be configured to detect infrared energy (heat), convert the detected infrared heat into an electronic signal, and process the electronic signal to produce a thermal image.

In various embodiments, image capturing system A170 may be in electric and/or electronic communication with a processor of a primary recording device. The processor may control (e.g., instruct) image capturing system A170 to begin capturing images and to end capturing of the images. The processor may also control (e.g., instruct) image capturing system A170 to transmit the captured images to a memory of the primary recording device for storage. Image capturing system A170 may transmit (e.g., stream) the captured images to the memory as the images are captured or in response to image capturing system A170 ending capturing of the images.

In various embodiments, image capturing system A170 may be configured to capture images and video as uncompressed, raw data. The uncompressed, raw data may be transmitted to recording device A100 for processing. In that regard, image capturing system A170 and/or auxiliary recording device A160 may not process images and/or videos before transmitting the images and/or videos to auxiliary recording device A160.

In various embodiments, auxiliary recording device A160 may be configured to receive instructions from a processor of a primary recording device to control operations of auxiliary recording device A160. In various embodiments, auxiliary recording device A160 may also comprise a user interface configured to at least partially control operations of auxiliary recording device. The user interface may comprise a button, switch, or the like and may be similar to any user interface described herein. The user interface may be configured to receive an activation event, and in response to the activation event, operate image capturing system A170 (e.g., instruct image capturing system A170 to capture an image or series of images).

In various embodiments, the network interface of auxiliary recording device A160 may be configured to enable the transmission and/or reception of data between auxiliary recording device A160 and one or more additional devices, servers, networks, or the like. For example, the network interface may be configured to enable the transmission and/or reception of data between auxiliary recording device A160 and a primary recording device. The network interface may be similar to any network interface discussed herein. The network interface may comprise one or more suitable hardware and/or software components capable of enabling the transmission and/or reception of data, such as, for example, a communications unit, a transmitter, and/or a receiver as discussed further herein. In various embodiments, auxiliary recording device A160 may only have a transmitter configured to transmit data (e.g., images, video, etc.) to a primary recording device. In various embodiments, auxiliary recording device A160 may have a transmitter and a receiver to transmit data (e.g., images, video, etc.) to and receive data (e.g., instructions) from a primary recording device.

In various embodiments, auxiliary recording device A160 may receive power from a primary recording device to power electrical components of auxiliary recording device A160. In various embodiments, auxiliary recording device A160 may comprise a power supply configured to at least partially provide onboard power to electrical components of auxiliary recording device A160. The power supply may comprise any battery, power supply, power source, or the like discussed herein.

In various embodiments, auxiliary recording device A160 may also comprise a light emitting source configured to emit light external the auxiliary recording device. The light emitting source may be configured to emit the light from (or through) an exterior surface of the body of auxiliary recording device A160. The light emitting source may comprise one or more components configured to emit light such as, for example, one or more light emitting components, flashlights, light emitting diodes (LED), and/or the like. The components may be arranged in any suitable manner, and may comprise individual light emitting components (e.g., an individual light, etc.), collective light emitting components (e.g., a light bar, a light strip, etc.), and/or a combination thereof. The light emitting source may be configured to receive power from an onboard power supply integrated into the light emitting source, a power supply of auxiliary recording device A160, and/or a power supply of a primary recording device in electric communication with auxiliary recording device A160.

In various embodiments, the processor of a primary recording device in communication with auxiliary recording device A160 may be configured to control operation of the light emitting source. For example, in response to determining the activation event the processor of the primary recording device may instruct image capturing system A170 of auxiliary recording device A160 to capture an image and instruct the light emitting source of auxiliary recording device A160 to emit the light. In various embodiments, the light emitting source may include a button, switch, or the like configured to enable a user to manually control operation of the light emitting source.

In various embodiments, auxiliary recording device A160 may comprise an onboard processor configured to perform various operations of auxiliary recording device A160, including operation of image capturing system A170. The processor may be similar to any processor, processing circuit, or the like described herein.

Figure 4:
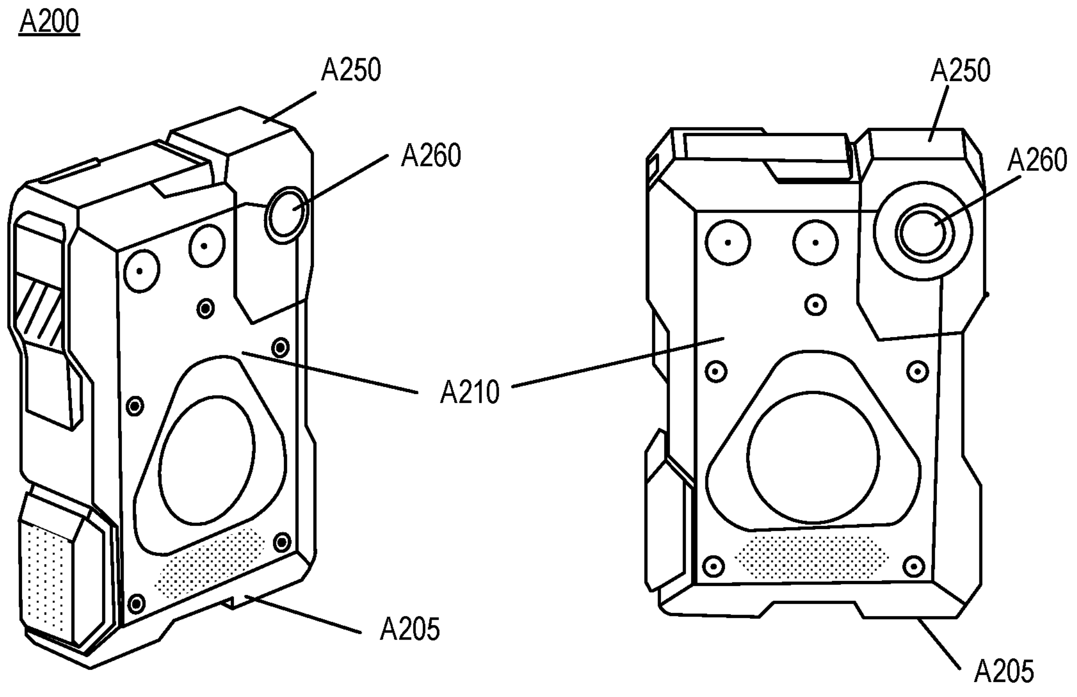
FIG. 4 shows an implementation of a recording device, according to some embodiments.
Figure 4:
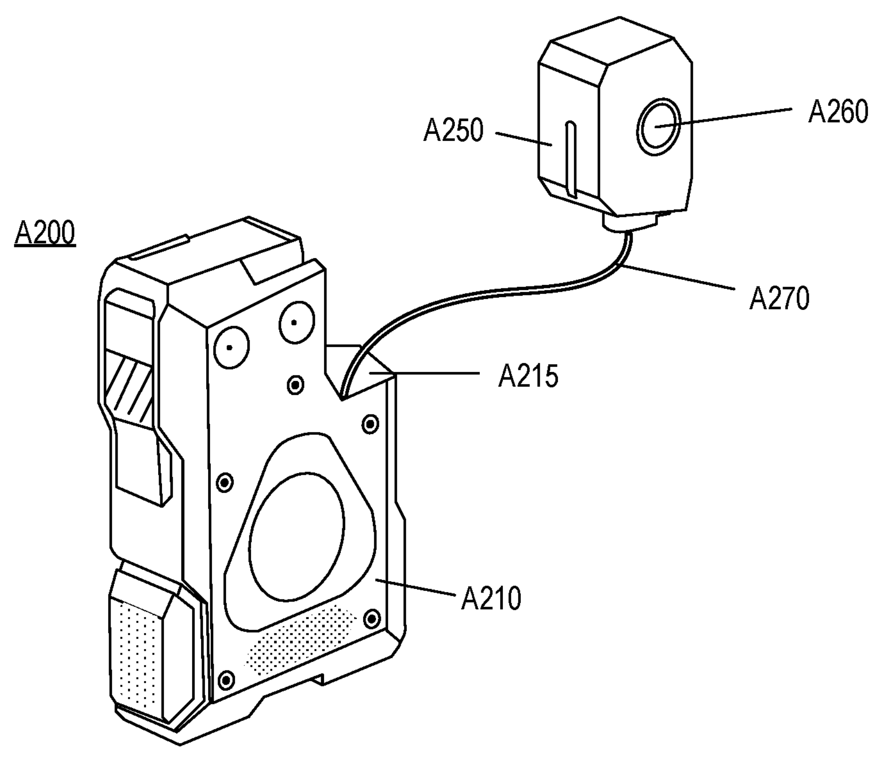

In various embodiments, and with reference to FIG. 4, a recording device A200 (e.g., a tethered recording device, a detachable recording device, etc.) comprises a detachable body. Recording device A200 may share similar components, features, structures, and the like with recording device A100 and/or auxiliary recording device A160, with brief reference to FIGS. 1, 2, and 3.

In various embodiments, recording device A200 may comprise a body A205 (e.g., housing) defining an outer surface of recording device A200. Body A205 may comprise one or more discrete subsections (e.g., separate bodies). Each discrete subsection may comprise an enclosed structure configured to house separate components of recording device A200. For example, body 205A may comprise a main housing body A210 and a detachable body A250. Main housing body A210 and detachable body A250 may be configured to couple together to form body A205. Detachable body A250 may be configured to detachably couple to main housing body A210. Main housing body A210 may comprise a larger portion of body A205 compared to detachable body A250 (e.g., as depicted in FIG. 4).

In various embodiments, main housing body A210 may define a dock A215. Dock A215 may define a portion of an outer surface of main housing body A210. Dock A215 may be configured to receive detachable body A250 to couple detachable body A250 to main housing body A210. In that regard, dock A215 may be sized and shaped to receive detachable body A250. In various embodiments, dock A215 may also be configured to provide power and/or data transmission capabilities to electrical components of detachable body A250, as discussed further herein.

Main housing body A210, dock A215, and/or detachable body A250 may comprise mechanical and/or structural features configured to aid in detachably coupling main housing body A210 and detachable body A250. For example, and in accordance with various embodiments, an outer surface of detachable body A250 may comprise a female mating feature. An outer surface of dock A215 may comprise a male mating feature. The female mating feature may interface with the male mating feature to detachably couple main housing body A210 and detachable body A250. As a further example, and in accordance with various embodiments, an outer surface of detachable body A250 may comprise a male mating feature. An outer surface of dock A215 may comprise a female mating feature. The male mating feature may interface with the female mating feature to detachably couple main housing body A210 and detachable body A250. The female mating feature may comprise a groove. The male mating feature may comprise a protrusion. The protrusion may be configured to engage the groove detachably couple main housing body A210 and detachable body A250.

As a further example, and in accordance with various embodiments, dock 215 and detachable body A250 may each comprise one or more magnets configured to magnetically attract each other to at least partially aid in detachably coupling main housing body A210 and detachable body A250.

As a further example, and in accordance with various embodiments, main housing body A210 may comprise a mechanical switch (e.g., a locking switch) configured to engage detachable body A250 to at least partially retain or release detachable body A250 from main housing body A210. The mechanical switch may be located on an outer surface of main housing body A210 proximate dock A215. The mechanical switch may also be located on an outer surface of dock A215. In response to detachable body A250 being inserted into dock A215 and the mechanical switch being engaged, detachable body A250 may be retained in dock A215. In response to the mechanical switch being disengaged, detachable body A250 may be free to detach from dock A215. In various embodiments, the mechanical switch may be spring load to bias the mechanical switch into the engaged position.

In various embodiments, main housing body A210 may comprise mechanical features configured to couple main housing body A210 to a surface. Main housing body A210 may be configured to couple (e.g., mount) to a user. The mechanical features may comprise a mount. For example, the mechanical features may be configured to interface with an article of clothing or a mount assembly on a user. Main housing body A210 may mount to a location on the user (e.g., a mount location, a second location, etc.). For example, main housing body A210 may mount to a belt mount, a chest mount, or a shoulder mount on the user.

In various embodiments, detachable body A250 may comprise mechanical features configured to couple detachable body A250 to a surface. Detachable body A250 may be configured to couple (e.g., mount) to a user. The mechanical features may comprise a mount. For example, the mechanical features may be configured to interface with an article of clothing or a mount assembly on a user. Detachable body A250 may mount to a location on the user (e.g., a mount location, a first location, etc.). For example, detachable body A250 may mount to a chest mount, a shoulder mount, an eyewear mount, an earpiece mount, a lapel mount, and/or any other mounting surface disclosed herein.

In response to main housing body A210 being mounted to the second location on the user and detachable body A250 being coupled to main housing body A210, the mount of detachable body A250 may not be engaged with a surface of the user (e.g., only the mount of main housing body A210 is engaged with a surface of the user). In response to main housing body A210 being mounted to the second location on the user and detachable body A250 being detached from main housing body A210 and mounted to the first location on the user, the respective mount of each of main housing body A210 and detachable body A250 may be engaged with distinct surfaces of the user.

In various embodiments, main housing body A210 may be configured to house (fully and/or at least partially) electrical and/or electronic components of recording device A200 including, for example, an audio capturing system, a user interface, a processor, a memory, a network interface, a power supply, and/or the like. The audio capturing system may be similar to any audio capturing system discussed herein, including audio capturing system A140 of recording device A100. The user interface may be similar to any user interface discussed herein, including user interface A110 of recording device A100. The processor may be similar to any processor, processing circuit, or the like discussed herein, including the processor of recording device A100. The memory may be similar to any memory discussed herein, including the memory of recording device A100. The network interface may be similar to any network interface, receiver, or the like discussed herein, including the network interface of recording device A100. The power supply may be similar to any power supply, power source, battery, or the like discussed herein, including the power supply of recording device A100. In that regard, the electrical and/or electronic components of recording device A200 stored in main housing body A210 may be configured to perform similar functions and operations as those electrical and/or electronic components of recording device A100, as previously discussed.

As a further example, and in accordance with various embodiments, main housing body A210 may be configured to house (fully and/or at least partially) an audio output system, an audio output volume control, a communications interface, a display, a power charging port, a power switch, and/or the like. The audio output system may be similar to audio output system A112 of recording device A100. The audio output volume control may be similar to audio output volume control A114 of recording device A100. The communications interface may be similar to communications interface A116 of recording device A100. The display may be similar to display A118 of recording device A100. The power charging port may be similar to power charging port A120 of recording device A100. The power switch may be similar to power switch A122 of recording device A100.

In various embodiments, detachable body A250 may be configured to house (fully and/or at least partially) electrical and/or electronic components of recording device A200 including, for example, an image capturing system A260, a network interface, and/or the like. Image capturing system A260 may be similar to any image capturing system discussed herein, including image capturing system A170 of auxiliary recording device A160. The network interface may be similar to any network interface, transmitter, or the like discussed herein, including the network interface of auxiliary recording device A160.

As a further example, and in accordance with various embodiments, detachable body A250 may be configured to house (fully and/or at least partially) a user interface, a memory, a processor, a power supply, and/or the like. The user interface may be similar to any user interface discussed herein, including the user interface of auxiliary recording device A160. The memory may be similar to any memory discussed herein, including the memory of auxiliary recording device A160. The processor may be similar to any processor, processing circuit, or the like discussed herein, including the processor of auxiliary recording device A160. The power supply may be similar to any power supply, power source, battery, or the like discussed herein, including the power supply of auxiliary recording device A160. In that regard, the electrical and/or electronic components of recording device A200 stored in detachable body A250 may be configured to perform similar functions and operations as those electrical and/or electronic components of auxiliary recording device A160, as previously discussed.

In various embodiments, image capturing system A260 may be configured to capture images both while detachable body A250 is coupled to main housing body A210 and while detachable body A250 is detached from main housing body A210. Detachable body A250 may be in electronic communication with main housing body A210 to transmit the captured images from image capturing system A260 to a memory in main housing body A210. For example, a network interface of detachable body A250 (e.g., a transmitter) may communicate with a network interface of main housing body A210 (e.g., a receiver) to communicate the images. The network interface of detachable body A250 may also communicate with the network interface of main housing body A210 to receive commands and instructions (e.g., from a processor of main housing body A210).

In various embodiments, electronic communication between detachable body A250 and main housing body A210 may be provided via a wired tether A270. Wired tether A270 may extend from detachable body A250 to main housing body A210. Wired tether A270 may be configured to enable the transmission of data to and from the detachable body A250 and main housing body A210. Wired tether A270 may also be configured to enable the transmission of power from main housing body A210 to the detachable body A250. In various embodiments, wired tether A270 may comprise an industry-standard wired cable for transmitting both data and power on a single cable, such as, for example, a USB Type-C cable. In various embodiments, wired tether A270 may comprise a proprietary cable for transmitting data and power. The proprietary cable may transmit both data and power on a single cable. The proprietary cable may have a separate power cable and a separate data cable configured to provide the transmissions.

In various embodiments, wired tether A270 may be disposed through an outer surface of dock A215 and at least partially stored inside main housing body A210. For example, in response to detachable body A250 being coupled to dock A215 of main housing body A210, a first portion of wired tether A270 may be stored inside main housing body A210 to ensure that detachable body A25 may fully couple to dock A215. In response to detachable body A250 being detached from dock A215, wired tether A270 may be deployed from dock A215 to enable detachable body A250 to extend away from main housing body A210 while still maintaining electronic communication. In the deployed state, only a second portion of wired tether A270 may be stored inside main housing body A210. The first portion of wired tether A270 may define a greater portion of wired tether A270 compared to the second portion of wired tether A270.

In various embodiments, wired tether A270 may be stored in a winding in main housing body A210. The winding may be configured to at least partially reduce a volume of an interior of main housing body A210 that wired tether A270 consumes. The winding may be greater in response to the first portion being stored inside main housing body A210 and smaller in response to the second portion being stored inside main housing body A210.

In various embodiments, main housing body A210 may comprise a retractable winding mechanism configured to wind wired tether A270 into a winding. The retractable winding mechanism may be configured to retract wired tether A270 into (or around) the retractable winding mechanism in response to detachable body A25 being coupled to dock A215. The retractable winding mechanism may be configured to deploy (or enable deployment of) wired tether A270 in response to detachable body A25 being detached and extended away from dock A215. In various embodiments, the retractable winding mechanism may comprise a mechanical stop configured to at least partially prevent the retractable winding mechanism from retracting wired tether A270 while detachable body A250 is detached from dock A215. In various embodiments, main housing body A210 may comprise a wired tether release button mechanically coupled to the mechanical stop and/or the retractable winding mechanism. In response to the wired tether release button being operated (e.g., depressed, switched, etc.), the wired tether release button is configured to engage the stop and/or the retractable winding mechanism to allow the retractable winding mechanism to retract wired tether A270.

In various embodiments, electronic communication between detachable body A250 and main housing body A210 may be provided via a data transfer port on an outer surface of dock A215. In that regard, detachable body A250 may be in local electronic communication with main housing body A210 in response to detachable body A250 being coupled to housing body A210. In various embodiments, in response to detachable body A250 being detached from housing body A210, detachable body A250 may no longer be in local electronic communication with main housing body A210. In various embodiments, in response to detachable body A250 being detached from housing body A210, detachable body A250 may no longer be in local electronic communication with the data transfer port of dock A215 but may establish a wireless electronic communication with main housing body A210.

The data transfer port may be configured to configured enable the transmission of data to and from the detachable body A250 and main housing body A210. The data transfer port may also be configured to enable the transmission of power from main housing body A210 to the detachable body A250. For example, and in accordance with various embodiments, in response to detachable body A250 comprising a rechargeable power supply, detachable body A250 may power its components using the rechargeable power supply while detached from main housing body A210, and may power its components and/or recharge the rechargeable power supply with power from main housing body A210 in response to being coupled to dock A215.

Further, and in accordance with various embodiments, image capture system A260 of detachable body A250 may capture images and store the images in local memory on detachable body A250 while detachable body A250 is detached from main housing body A210. In response to detachable body A250 coupled to main housing body A210, detachable body A250 may transfer the images to memory on main housing body A210 for storage.

In various embodiments, electronic communication between detachable body A250 and main housing body A210 may be provided via a wireless electronic communication. Detachable body A250 may transmit images to main housing body A210 via the wireless electronic communication. A processor of main housing body A210 may transmit (via a network interface) instructions and commands to detachable body A250 via the wireless electronic communication.

Figure 5:
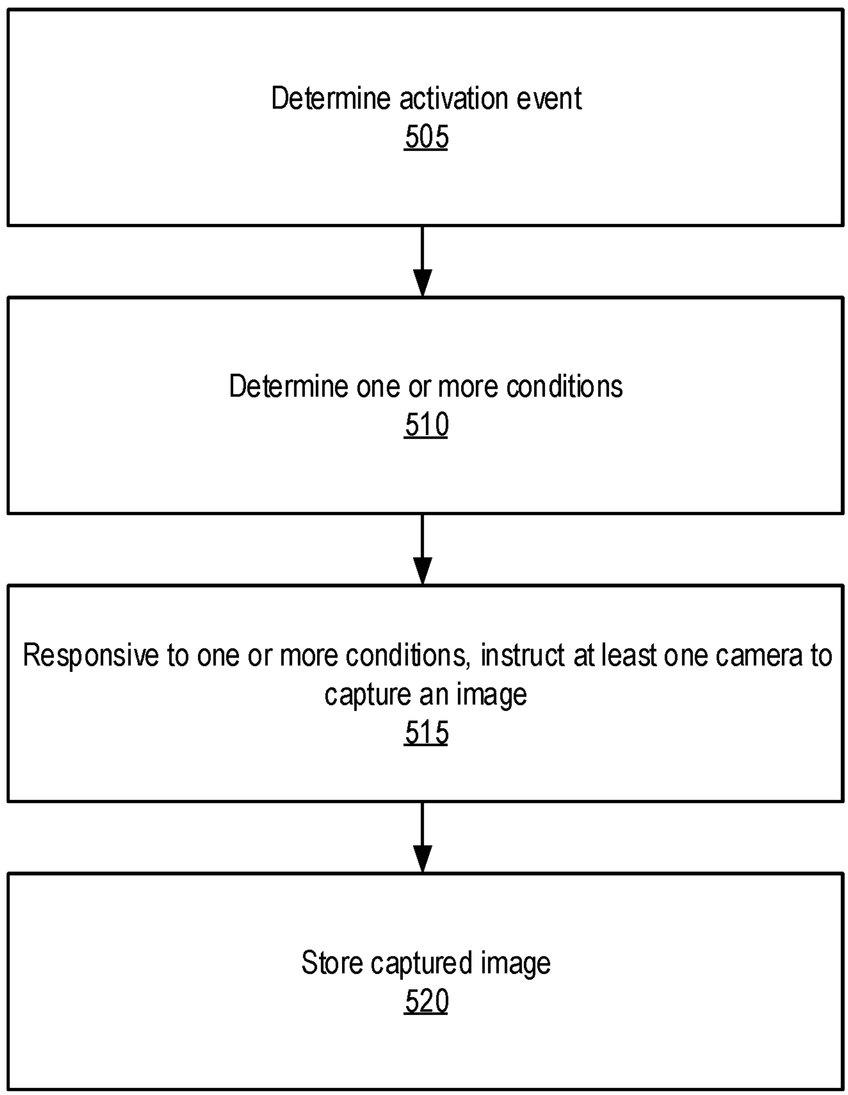
FIG. 5 is a flowchart illustrating a method for selecting recording devices for capturing images, according to some embodiments.

In various embodiments, in response to detachable body A250 being detached from dock A215, the processor of main housing body A210 and/or a processor of detachable body A250 may instruct image capturing system A260 to capture images at a lower quality setting. FIG. 5 is a flowchart illustrating a method for selecting recording devices for capturing images, according to some embodiments. For example, and in accordance with various embodiments, the method may include one or more steps for selecting between (or together with) a primary recording device and an auxiliary recording device. In other embodiments, the method may include one or more steps for selecting between (or together with) a plurality of recording devices including at least one primary recording device and at least one auxiliary recording device.

An image capturing system A170 comprises a recording device A100 and an auxiliary recording device A160. The recording device A100 determines 505 an activation event. In some embodiments, the recording device A100 comprises an audio sensor and the activation event is an audio input captured by the audio sensor, e.g., a verbal cue by a user of the image capturing system A170. In some embodiments, the recording device A100 comprise a touch interface, biometric authorization interface, a switch, a button, or other interface configured to receive user input, and the activation event is an instruction by the user of the image capturing system A170. In some embodiments, the recording device A100 comprises a wired or wireless communication interface communicatively coupled to a remote or third-party network, system, or device and the activation event is an instruction, notification, or message received via the communication interface. For example, the recording device A100 is communicatively coupled via a wired or wireless interface to an onboard system of a vehicle and receives, from the onboard system of the vehicle, an instruction to initiate image capture. In some embodiments, the recording device A100 comprises a GPS or other location sensor and the activation event is based at least in part on the image capturing system A170 being within a threshold distance of a location, e.g., a location of an incident, a building or other point of interest, or the like.

The recording device A100 determines 510 one or more conditions. The one or more conditions may be information associated with an incident, e.g., facts about the incident, consequences of the incident, priority of the incident, time of the incident, location of the incident, identity of humans, animals, or objects related to the incident, and the like. The one or more conditions may be information about the image capturing system A170, the recording device A100, or the auxiliary recording device A160, e.g., a current location of the image capturing system A170, settings of the first camera of the auxiliary recording device, settings of the second camera of the recording device, a type of the first camera and/or the second camera, a mounting location of the auxiliary recording device, a mounting location of the recording device, a wired or wireless communication between the image capturing system and another entity or device, and the like. The one or more conditions may be instructions or notifications received by a user of the image capturing system A170 or another entity of the image capturing system, e.g., a verbal instruction by a user of the image capturing system to initiate image capture by the first camera and/or the second camera.

Responsive to the one or more conditions, the recording device A100 instructs 515 at least one of a first camera of the auxiliary recording device A160 to capture a first image or a second camera of the recording device to capture a second image. The recording device A100 may perform the instructing based at least in part on the one or more conditions.

In some embodiments, the recording device A100 instructs at least one of a first camera to capture a first image or a second camera to capture a second image based on one or more battery levels of the image capturing system A170. For example, in some embodiments, the image capturing system A170 comprises a power supply configured to provide power to the recording device A100 and the auxiliary recording device A160. In other embodiments, the recording device A100 and the auxiliary recording device A160 may comprise separate power supplies, e.g., batteries. The recording device A100 compares a power level of one or more of: a power supply of the image capturing system A170, a power supply of the recording device, or a power supply of the auxiliary recording device A160. Responsive to the respective power levels being less than a threshold value, the recording device A100 selects one or more of the first camera of the auxiliary recording device A160 or the second camera of the recording device to perform the image capture. For example, if a power level of a power supply of the image capturing system A170 is less than a threshold value, the recording device A100 instructs the second camera of the recording device to capture a second image, such as to preserve battery power in the system by reducing a total number of cameras. In another example, if a power level of the power supply of the image capturing system A170 is equal to or greater than a threshold value, the recording device A100 instructs both the first camera of the auxiliary recording device A160 and the second camera of the recording device to capture a first and second image, respectively.

In some embodiments, the recording device A100 instructs at least one of a first camera to capture a first image or a second camera to capture a second image based on a current location of the image capturing system A170. In some examples, the image capturing system A170 comprises a GPS or other location sensor and the recording device A100 determines a current location of the image capturing system based on the GPS or other location sensor. In other examples, the recording device A100 is configured to determine a current location based at least in part on established communications connections, wired or wireless. A current location of the image capturing system A170 may be determined, for example, based on a wired or wireless communication connection with a vehicle onboard system, a wired or wireless communication connection to a WiFi, BLUETOOTH®, or other network, or a wired or wireless communication connection to another entity of the image capturing system A170 or third-party entity. Based on information about the current location, the recording device A100 determines whether the first camera of the auxiliary recording device A160 or the second camera of the recording device will provide useful, unobstructed, or otherwise valuable (e.g., useful, important, etc.) images. For example, the recording device A100 determines that the image capturing system A170 is in a vehicle based on a communication connection to a vehicle onboard system. Responsive to detecting that the image capturing system A170 is in a vehicle, the recording device A100 determines that the first camera of the auxiliary recording device A160 is mounted at a shoulder of a user and that the second camera of the recording device is mounted at a lower location, e.g., a torso or hip of a user, and that the first camera of the auxiliary recording device is more likely to provide an unobstructed view of an ongoing incident. As such, the recording device A100 instructs the first camera of the auxiliary recording device A160 to capture the first image.

In some embodiments, the recording device A100 instructs at least one of a first camera to capture a first image or a second camera to capture a second image based on obstructions, low lighting, and other environmental conditions that may impact the quality of captured images by the first or second cameras. In some embodiments, the first camera and the second camera may be configured to perform optimally under different environmental conditions, e.g., such that one camera may be configured to mimic a human eye and another camera may be configured to perform optimally in low light. In other embodiments, one camera may be an infrared camera configured to capture infrared image data. Responsive to the recording device A100 determining that an incident is occurring in environmental conditions that are better suited to one of the first camera or the second camera, the recording device may instruct the camera configured to perform optimally under the environmental conditions to capture a respective image. In some embodiments, the recording device A100 is configured to detect obstructions or likely obstructions to the first and second cameras. For example, the recording device A100 may instruct the first and second cameras to capture test images to detect obstructions, e.g., determining based on a test image that an obstruction takes up more than a threshold percentage of the field of view of the respective camera. In another example, the recording device A100 may determine that either of the first or second cameras are likely obstructed based on a location of the first and second cameras and information about the incident, e.g., wherein a firearm or conducted electrical weapon (CEW) being drawn by a user of the image capturing system A170 is likely to obstruct a body-worn camera. In some embodiments, the recording device A100 determines that a firearm or CEW is drawn based on a communication between the recording device and the firearm, CEW, or holster of the respective weapon.

In some embodiments, the recording device A100 instructs at least one of a first camera to capture a first image or a second camera to capture a second image based on field of view or incident events to maximize image capture of relevant information to incidents. In some embodiments, the recording device A100 comprises a body-worn camera and the auxiliary recording device A160 may be an omnidirectional camera, a multi-lens camera, a narrow angle field of vision camera, or a wide angle field of vision camera. In some embodiments, the auxiliary recording device A160 may be positioned to at least partially align with a visual point of view of a user of the image capturing system A170. During incidents, the recording device A100 instructs at least one of the first camera to capture a first image or the second camera to capture a second image based on a likelihood of the respective first or second cameras capturing relevant information to the incidents. A likelihood of relevant information may be determined at least in part on one or more of: audio input indicating activity from a direction (e.g., speaking, gunshots, or other commotion from a direction); information about a location of the incident; information about a current location of the image capturing system A170; motion data indicating activity from a direction; and the like. In some examples, the recording device A100 may instruct both the first camera to capture the first image and the second camera to capture the second image so as to provide a visual point of view of the user and a 360-degree view of the incident.

In some embodiments, the recording device A100 instructs at least one of a first camera to capture a first image or a second camera to capture a second image based on a standardized protocol. The standardized protocol may be implemented by a user of the image capturing system A170 or initiated responsive to an activation event occurring. In some embodiments, a standardized protocol selects one of the first camera or the second camera as a default for image capture. The default camera may be selected based on, for example, battery life optimization, image quality, camera configuration, and the like. Responsive to an activation event, the recording device A100 may activate the other of the first camera or the second camera. The other of the first camera or the second camera may be configured, for example, to provide a different field of view, a higher quality image capture, audio or other sensor data capture, and the like.

In some embodiments, the recording device A100 instructs at least one of a first camera to capture a first image or a second camera to capture a second image based on a connection status between the first camera and the second camera. For example, in some embodiments the first camera may be in wired electronic communication with the second camera. In response to the wired communication becoming disconnected, frayed, or otherwise an intermittent communication, the first camera and the second camera may no longer be in electronic communication, or may experience an intermittent communication. In that regard, in response to the first camera detecting the dropped or intermittent communication with the second camera, the first camera may capture the first image. In response to the second camera detecting the dropped or intermittent communication with the first camera, the second camera may capture the first image.

As a further example, in some embodiments the first camera may be in wireless electronic communication with the second camera. In response to the wireless communication becoming disconnected, intermittent, or unreliable, the first camera and the second camera may no longer be in electronic communication, or may experience an intermittent communication. In that regard, in response to the first camera detecting the dropped or intermittent communication with the second camera, the first camera may capture the first image. In response to the second camera detecting the dropped or intermittent communication with the first camera, the second camera may capture the first image.

In some embodiments, the recording device A100 instructs at least one of a first camera to capture a first image or a second camera to capture a second image based on an audio input received by the first camera, the second camera, or an external system or device. For example, the audio input may comprise a voice command instruction recording system A100 to activate a first camera (e.g., "Activate First Camera," "Activate Primary Camera," etc.), a second camera (e.g., "Activate Second Camera," "Activate Auxiliary Camera," etc.), or activate the first camera and the second camera (e.g., "Activate All Cameras," etc.). Recording device A100 may instruct at least one of the first camera or the second camera accordingly. As a further example, the audio input may comprise a detected sound, such as an alarm sound, a gunshot sound, a glass breaking sound, or the like. In that regard, upon recording device A100 or an external system or device detecting the detected sound, recording device A100 may instruct at least one of a first camera to capture a first image or a second camera to capture a second image.

In other embodiments, the recording device A100 instructs at least one of a first camera to capture a first image or a second camera to capture a second image based at least in part on one or more of: an instruction, notification, or other input (e.g., verbal or touch) by a user of the image capturing system A170; an instruction, notification, or other input by another entity of the image capturing system A170 or a third-party or remote entity; a type of incident or information about the incident; and the like.

In some embodiments wherein the first camera of the auxiliary recording device A160 is instructed to capture a first image, the recording device A100 may receive the captured first image from the auxiliary recording device in real-time or in near real-time. For example, the recording device A100 receives the captured first image from the auxiliary recording device A160 via a wired connection, e.g., a wired tether A270, or via a wireless connection, e.g., via BLUETOOTH® or another communication interface. In other embodiments, the recording device A100 may receive the captured first image from the auxiliary recording device A160 at a periodic time interval or at a scheduled time. The received captured first image may be unprocessed or preprocessed.

The recording device A100 stores the at least one of the first image and the second image in a memory of the recording device. In some embodiments, the recording device A100 applies one or more preprocessing or image processing algorithms to the at least one of the first image and the second image. Preprocessing or image processing may comprise, for example, resizing the first or second images, removing background noise from the first or second images, orienting the first or second images, applying color corrections to the first or second images, applying overlaid information or data to the first or second images, associating metadata with the first or second images, and the like. In some embodiments, image processing may comprise applying one or more algorithms such that the captured image data simulates a point of view of a user of the image capturing system A170.

In embodiments of FIG. 5, the method may be performed by a recording device A100 of an image capturing system A170. In other embodiments, the method may be performed in part or in whole by other entities of the image capturing system A170. Further, in other embodiments, the method may comprise additional or fewer steps, and the steps may be performed in a different order than described in conjunction with FIG. 5.

Body-Worn Battery

In various embodiments, a body-worn battery may be configured to couple an accessory (e.g., camera, recording device, microphone, etc.) to an article of wear (e.g., clothing, jacket, uniform, hat, vest, gloves, pants, shoes, etc.). Articles of wear may comprise various properties, such as thickness, texture, material (e.g., synthetic, natural, blend, etc.), number of layers, and/or the like. The body-worn battery may permanently or releasably couple to the article of wear. The body-worn battery may permanently or releasably couple to the accessory. The body-worn battery may comprise a power supply (e.g., energy store, energy store, battery, etc.) configured to store power and/or provide the stored power to the accessory. The power supply may be removable or permanently disposed in the body-worn battery. Upon coupling the accessory with the body-worn battery, the body-worn battery may be configured to provide the stored power to the accessory to energize (e.g., power, recharge, etc.) the accessory. The body-worn battery may provide the stored power via a wired connection, a wireless connection, or either of a wired connection and a wireless connection. In various embodiments, coupling the accessory to the body-worn battery may engage a wireless and/or wired connection, thereby enabling transfer of the stored energy to the accessory. In some embodiments, an interface (e.g., battery interface) may be engaged to enable transfer of stored energy between the body-worn battery and the accessory. The interface may be in electrical communication with the power supply. The interface may be an inductive coil in electrical communication with the power supply, enabling power to be transferred wirelessly to and/or from the body-worn battery. The interface may comprise a terminal in electrical communication with the power supply. The body-worn battery may be configured to couple to an article of wear via one or more mounting features, such as adhesives, magnets, hook and loop, mechanical interlocks, and any other suitable mounting feature configured to releasably or permanently couple the body-worn battery to the article of wear. In some embodiments, the body-worn battery may be configured to be directly stitched to an article of wear. In some embodiments, the body-worn battery may comprise one or more structures configured to engage an article of wear, such as those disclosed in U.S. patent application Ser. No. 16/858,100, and U.S. Pat. No. 9,377,161, which are herein incorporated by reference in their entirety.

In various embodiments, aspects of this disclosure relate to a body-worn battery configured to couple an accessory (e.g., camera, recording device, microphone, etc.) to a mount, such as a mount for a body-worn camera. The accessory may include a first coupling feature configured to releasably engage a second coupling feature of the mount. The body-worn battery may be configured to releasably engage the first coupling feature of the accessory via a third coupling feature of the body-worn battery. The body-worn battery may be configured to releasably engage the second coupling feature of the mount via a fourth coupling feature of the body-worn battery. In this manner, the body-worn battery may be interchangeably disposed between an accessory and a mount to provide additional power to the accessory. The body-worn battery may be interchangeably coupled to different mounts and accessories having respective coupling features configured to cooperate with the coupling features of the body-worn battery. In situations in which a body-worn battery is not required, the body-worn battery may simply be decoupled from each of the accessory and the mount, and the accessory may then be directly coupled to the mount via the first coupling feature and the second coupling feature.

In various embodiments, aspects of this disclosure relate to a body-worn battery configured to couple to an article of wear. The body-worn battery may comprise one or more mounting features configured to releasably or permanently couple the body-worn battery to the article of wear. The body-worn battery may be configured to be disposed remote of the accessory. The body-worn battery may comprise an interface configured to engage the remote accessory to provide power to the remote accessory.

In various embodiments, and with reference to FIG. 6A, a body-worn battery system, such as system B10, for coupling an accessory to an article of wear is disclosed. It should be understood by one skilled in the art that FIG. 6A is example illustration of system B10. In the example of FIG. 6A, system B10 may comprise a body-worn battery B200 and an accessory B100. System B10 may releasably or permanently couple to an article of wear, such as article of wear B102.

In various embodiments, body-worn battery B200 may comprise one or more mounting features configured to permanently or releasably couple body-worn battery B200 to article of wear B102 (e.g., article, garment, carrier. etc.) as previously described herein. For example, body-worn battery B200 may comprise mounting feature B260, configured to cooperate with article of wear B102 to releasably or permanently couple body-worn battery B200 to article of wear B102. Mounting feature B260 may comprise one of a hook and a loop feature configured to releasably engage the other of the hook and the loop feature of article of wear B102. As another example, mounting feature B260 may comprise a modular lightweight load-carrying equipment (MOLLE) mount configured to releasably engage a strap (e.g., MOLLE strap) of article of wear B102. As yet another example, mounting feature B260 may comprise one or more ferromagnetic and/or ferrimagnetic materials configured to releasably engage one or more ferromagnetic and/or ferrimagnetic materials disposed on an inner surface of article of wear B102.

In some embodiments, mounting feature B260 may be configured to permanently couple body-worn battery B200 to article of wear B102. For example, mounting feature B260 may comprise a pad configured to be stitched directly to article of wear B102. As another example, mounting feature B260 may comprise an adhesive, such as an iron-on adhesive, configured to permanently couple body-worn battery B200 to article of wear B102.

In various embodiments, body-worn battery B200 may be configured to engage an accessory B100. Body-worn battery B200 may comprise one or more coupling features configured to enable body-worn battery B200 to releasably or permanently couple with accessory B100. In some embodiments, accessory B100 may be configured to permanently couple to first coupling feature B230 of body-worn battery B200 (with brief reference to FIG. 7). For example, accessory B100 may couple with first coupling feature B230 via permanent methods such as fasteners, welds, heat stakes, adhesives, and/or the like. In other embodiments, first coupling feature B230 may be configured to releasably receive accessory B100. For example, first coupling feature B230 may be configured to releasably receive accessory B100 via a coupler (e.g., joint), such as a coupler as disclosed in U.S. Pat. No. 9,756,930, which is herein incorporated by reference in its entirety.

In various embodiments, it may be advantageous for first coupling feature B230 to releasably receive accessory B100. For example, accessory B100 may be decoupled (e.g., disengaged, removed, etc.) from body-worn battery B200 while body-worn battery B200 remains coupled with article of wear B102. In this regard, body-worn battery B200 may remain on article of wear B102, while accessory B100 is removed (e.g., for charging, data transfer, maintenance, etc.). This may also be advantageous in that body-worn battery B200 need not be remounted to article of wear B102 when accessory B100 is removed. Accessory B100 may comprise a respective coupling feature, such as second coupling feature B140 configured to couple with first coupling feature B240. Second coupling feature B140 may comprise a male connector, such as male connector B144 (with brief reference to FIG. 6B. Male connector B144 may be configured to cooperate with a respective female connector, such as female connector B234 of battery mount B200. One of skill in the art will appreciate that male connector B144 and female connector B234 may be interchanged between body-worn battery B200 and accessory B100.

In various embodiments, one or more components of body-worn battery B200 may be formed of one or more rigid, durable materials able to withstand force(s) applied to body-worn battery B200 during use. For example, one or more components of body-worn battery B200 may include one or more rigid materials, plastic materials, metal materials, and/or composite materials. The one or more rigid materials may include corrosion-resistant materials, UV resistant materials, and/or any other suitable material configured to at least partially withstand environmental factors. Rigid materials may include metals and metallic alloys (e.g., aluminum, steel, titanium, etc.), composites (e.g., fiberglass, carbon fiber, etc.), plastics (e.g., polycarbonate, acrylonitrile butadiene styrene, polyether ether ketone, etc.), and/or the like. The rigid materials may also be treated (e.g., heat-treated, galvanized, anodized, etc.), painted (e.g., powder-coated, e-coated, etc.), and/or similarly modified to aid in withstanding environmental factors.

In various embodiments, and with reference to FIG. 7, a body-worn battery B200 is disclosed. It should be understood by one skilled in the art that FIG. 7 is an example illustration of body-worn battery B200, and one or more of the components of body-worn battery B200 may be located in any suitable position within, or external to, body-worn battery B200. The components of body-worn battery B200 may be formed using any number of methods, such as casting, forging, molding, and machining. A shape, size, and/or thickness of body-worn battery B200 may be configured to minimize an overall thickness of body-worn battery B200. In the example of FIG. 7, body-worn battery B200 may comprise a body B210, a power supply B220 (e.g., energy store, energy storage, battery, etc.), and a first coupling feature B230.

In various embodiments, body B210 may comprise a generally rectangular shape. A shape of body B210 may be similar to a shape of accessory B100. Body B210 may include a first body end B211 and a second body end B212. First body end B211 may be opposite second body end B212. First body end B211 may be parallel with second body end B212. A widest dimension of body B210 may be a width between first body end B211 and second body end B212. The width between first body end B211 and second body end B212 may be configured to minimize an overall width of body-worn battery B200. Body B210 may include a third body end B213 (e.g., top, first side, etc.) and a fourth body end B214 (e.g., bottom, second side, etc.). Third body end B213 may be opposite fourth body end B214. Third body end B213 may be parallel with fourth body end B214. A longest dimension of body B210 may be a width between third body end B213 and fourth body end B214. The length between third body end B213 and fourth body end B214 may be configured to minimize an overall length of body-worn battery B200. Third body end B213 may extend between first body end B211 and second body end B212. Third body end B213 may be perpendicular to first body end B211, second body end B212, or first body end B211 and second body end B212. Fourth body end B214 may extend between first body end B211 and second body end B212. Fourth body end B214 may be perpendicular to first body end B211, second body end B212, or first body end B211 and second body end B212.

In various embodiments, body B210 may comprise an outer body surface B215 (e.g., first body surface, first surface, etc.) and an inner body surface B216 (e.g., second body surface, second surface, etc.). Outer body surface B215 may be opposite inner body surface B216. Outer body surface may be parallel with inner body surface B216. Outer body surface B215 may join body ends B211/B212/B213/B214. Inner body surface B216 may join body ends B211/B212/B213/B214. A thinnest dimension of body B210 may be a thickness between outer body surface B215 and inner body surface B216. The thickness between outer body surface B215 and inner body surface B216 may be less than 0.125 inches, (0.3175 centimeters), less than 0.25 inches (0.635 centimeters), less than 0.375 inches (0.953 centimeters), or less than 0.5 inches (1.27 centimeters) in embodiments according to various aspects of the present disclosure.

In various embodiments, body-worn battery B200 may comprise one or more mounting features configured to enable body B210 to permanently or releasably couple to article of wear B102 as previously described herein, such as mounting feature B260. Mounting feature B260 may be disposed on inner body surface B216. For example, inner body surface B216 may comprise a belt clip configured to be mounted to a belt of a user. As another example, inner body surface B216 may comprise one of a hook pad, a loop pad, or a hook and loop pad configured to engage a respective hook pad, loop pad, or hook and loop pad of article of wear B102.

In various embodiments, body B210 may include a coupling feature, such as first coupling feature B230. First coupling feature B230 may be disposed adjacent outer body surface B215. In some embodiments, first coupling feature B230 may be configured to permanently engage accessory B100. For example, first coupling feature B230 may couple with accessory B100 via methods such as fasteners, welds, heat stakes, adhesives, and/or the like. As another example, first coupling feature B230 may be unitary with accessory B100. That is, first coupling feature B230 may be directly integrated with a housing of accessory B100.

In various embodiments, first coupling feature B230 may be configured to releasably receive accessory B100. For example, first coupling feature B230 may be configured to releasably receive accessory B100 via a male or female connector. In that regard, first coupling feature B230 may comprise a female connector, such as female connector B234. Female connector B234 may be configured to releasably engage a male connector of accessory B100, such as male connector B144. In this manner, accessory B100 may be releasably engaged with first coupling feature B230 via male connector B144 of body-worn battery B100 and female connector B234 of body-worn battery B200.

In various embodiments, body-worn battery B200 may include a power supply B220. Power supply B220 may be configured to provide power to various components of accessory B100. For example, power supply B220 may provide energy for operating the electronic and/or electrical components (e.g., parts, subsystems, circuits, etc.) of accessory B100. Power supply B220 may provide electrical power. Providing electrical power may include providing a current at a voltage. Electrical power from power supply B220 may be provided as a direct current ("DC"). Electrical power from power supply B220 may be provided as an alternating current ("AC"). Power supply B220 may include a battery. The energy of power supply B220 may be renewable or exhaustible, and/or replaceable. For example, power supply B220 may comprise one or more rechargeable or disposable batteries. In various embodiments, the energy from power supply B220 may be converted from one form (e.g., electrical, magnetic, thermal) to another form.

In various embodiments, power supply B220 may be removable from body B210 of body-worn battery B200. For example, power supply B220 may be configured to be removed from body-worn battery B200 such that body-worn battery B200 may remain coupled to article of wear B102 while power supply B220 is being serviced and/or charged. In some embodiments, power supply B200 may be permanently disposed within body B210 of body-worn battery B200. Body B210 may be configured to safely store power supply B220 under typical operating temperatures, charging temperatures, and storage temperatures of power supply B220.

In various embodiments, body B210 of body-worn battery B200 may be configured to receive one or more different types of power supplies. For example, body B210 may be configured to receive a first power supply of a first type, a second power supply of a second type different from the first type, and or the like. The different types of power supplies may comprise similar or different dimensions. In that regard, body B210 may be sized and shaped, or otherwise configurable, to receive different types of power supplies having different dimensions. In various embodiments, body-worn battery B200 may include a variety of electrical interfaces configured to accommodate the different types of power supplies.

In various embodiments, power supply B220 may comprise one or more rechargeable cells, such as a lithium-ion cell, a lithium-polymer cell, a nickel-metal hydride cell, or any other suitable cell configured to store chemical energy. Two or more rechargeable cells may be arranged in series and/or parallel. One or more rechargeable cell may be selected to optimize specific energy of power supply B220. In various embodiments, the specific energy of power supply B220 may be between 100 watt hours per kilogram and 400 watt hours per kilogram. A capacity of power supply B220 may be between 500 milliamp hours and 1,000 milliamp hours, between 1,000 milliamp hours and 5,000 milliamp hours, between 5,000 milliamp hours and 10,000 milliamp hours, between 10,000 milliamp hours and 30,000 milliamp hours, or between 500 milliamp hours and 30,000 milliamp hours. Power supply B220 may be configured to be charged at a C-rate and discharge at an E-rate. For example, power supply B220 may be configured to charge at a rate of 0.5C, 1C, 2C, 5C, or 10C. In that regard, power supply B220 may be configured to discharge at a rate 0.5C, 1C, 2C, 5C, or 10C.

In various embodiments, power supply B220 may comprise one or more protection circuits configured ensure safe operation, charge, and/or storage of power supply B220. The one or more protection circuits may be configured to prevent or limit swelling, short-circuit events, overheating, pressure build up, and other failure modes associated with rechargeable batteries. For example, power supply B220 may comprise a current interrupt device (CID) configured to interrupt a circuit of power supply B220 when a temperature, pressure, and/or voltage of power supply B220 exceeds a threshold. As another example, power supply B220 may comprise one or more integrated circuits (ICs) configured to monitor and/or limit charge rates, discharge rates, over-discharge, over-charge, etc.

In various embodiments, body-worn battery B200 may employ wireless (e.g., inductive, cordless, etc.) charging technology configured to transmit power to, from, or to and from power supply B220. For example, body B210 may comprise an induction coil configured to pair with a receiving induction coil of accessory B100. The induction coil may be disposed within first coupling feature B230, so as to minimize separation between the receiving induction coil of accessory B100 when accessory B100 is coupled to body-worn battery B200. In addition to providing power to an accessory via inductive charging, a body-worn battery B200 employing wireless charging technology may be configured to receive power (e.g., recharge) via inductive charging.

In various embodiments, body-worn battery B200 may employ one or more wired interfaces configured to transmit power to, from, or to and from power supply B220. In some embodiments, the interface may also be configured to transmit data, such as indicia relating to the state of charge (SoC) of a battery of accessory B100 and/or the state of charge of power supply B220. The interface may be fixed relative to body B210, such that coupling of accessory B100 to body-worn battery B200 establishes an electrical connection. In that regard, the interface may function as a dock, to dock accessory B100 to body-worn battery B200. For example, body B210, first coupling feature B230, or female connector B234 may comprise one or more terminals (e.g., terminal B252), such as, pogo pins, contacts, and the like configured to engage one or more respective terminals of accessory B100 upon coupling of accessory B100 to body-worn battery B200 to electrically coupled body-worn battery B200 with accessory B100. In this manner, one step of coupling an accessory B100 to body-worn battery B200 conveniently and simultaneously completes an electrical circuit between body-worn battery B200 and accessory B100. A charging device configured to recharge power supply B220 may be configured to engage body-worn battery B200 via the same one or more terminals. In this manner, body-worn battery B200 may be coupled with a charging dock via first coupling feature B230 to recharge body-worn battery B200.

In various embodiments, body-worn battery B200 may comprise one or more wired or wireless interfaces. For example, body-worn battery B200 may comprise interface B250. Interface B250 may be configured to be manually coupled to accessory B100 before or after coupling of accessory B100 to body-worn battery B200. Interface B250 may be configured to allow transfer of power from power supply B220 to accessory B100 via a receiving interface of accessory B100. Interface B250 may be configured to allow transfer of power from a charging device to power supply B220. Interface B250 may comprise a male terminal or a female terminal. Interface B250 may comprise one or more retention mechanisms, such as magnets, latches, and the like, configured to align and or secure interface B250 to a receiving interface of accessory B100. Interface B250 may comprise a cable (e.g., cord, corded cable, etc.), such as cable B254. Interface B250 may comprise a terminal, such as terminal B252. Cable B254 may terminate in terminal B252. Interface B250 may further comprise one or more strain reliefs, such as strain relief B256, configured to increase durability of interface B250. A strain relief may be disposed between cable B254 and terminal B252. A second strain relief may be disposed between cable B254 and body B210.

Terminal B252 may be configured to enable transfer of power to and/or from power supply B220. Terminal B252 may comprise a mechanical interface configured to transmit power. For example, terminal B252 may comprise a mechanical interface such as universal serial bus-A (USB-A), USB-B, USB-C, Mini-USB, Micro-USB, RJ45, and the like.

In various embodiments, body-worn battery B200 may comprise an indicia and/or a control configured to provide output and/or input. The indicia may comprise audible, tactile and/or visual indicia. The control may comprise a capacitive touch sensor, button, switch, or any other suitable control means configured to provide input to the battery. Activation of the control may cause the battery to begin providing power, stop providing power, or provide a battery status (e.g., state of charge) via the indicia. The indicia may comprise speakers, light-emitting diodes (LEDs), haptic motors, and the like. For example, body-worn battery B200 may comprise indicia and/or control B270. Indicia and/or control B270 may be disposed at a location on body-worn battery B200 configured to provide ergonomic access and/or viewing of indicia and/or control B270 to a user.

In various embodiments, a body-worn battery may be interchangeable with a battery of an accessory. For example, the battery of an accessory may be removed and replaced with a body-worn battery. In that regard, body-worn battery B200 may be configured to swap with a battery of accessory B100 to couple accessory B100 to article of wear B102.

Figure 8:
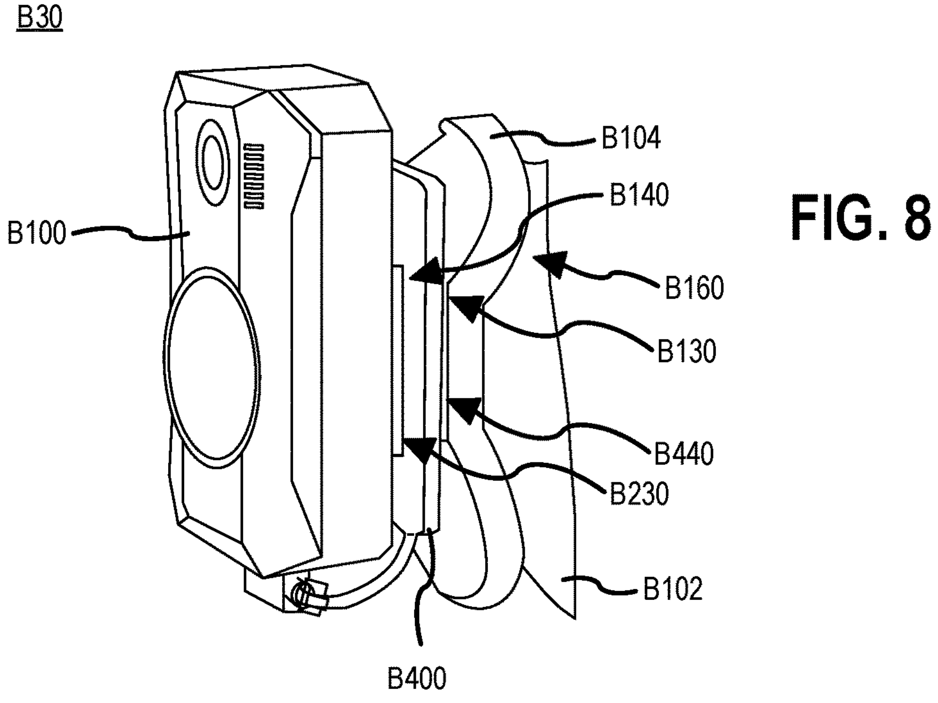
FIG. 8 is a front perspective view showing another implementation of a body-worn battery system, according to some embodiments.
Figure 9:
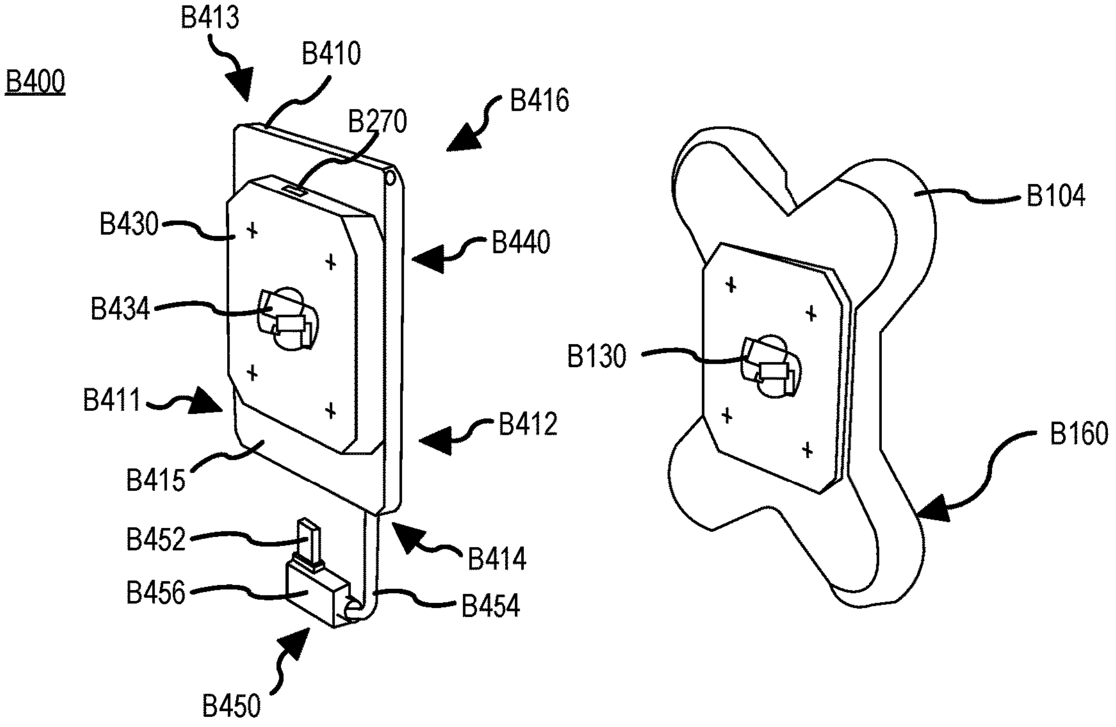
FIG. 9 is a front perspective view showing another implementation of a battery-worn battery and a mount, according to some embodiments.

FIGS. 8-9 show perspective views of another implementation of a body-worn battery system, which may be similar to, or share similar aspects or components with the body-worn battery systems previously described herein. It should be understood by one skilled in the art that FIGS. 8-9 are an example illustration of system B30. In the example of FIGS. 8-9, system B30 includes a body-worn battery B400, a mount B104, and an accessory B100. System B30 may releasably or permanently couple to an article of wear, such as article of wear B102.

For the body-worn battery B400 illustrated in FIGS. 8-9, features are referred to using similar reference numerals under the "B4*xx*" series of reference numerals, rather than "B2*xx*" as used in the body-worn battery embodiments of FIGS. 6-7. Accordingly, certain features of the body-worn battery B400 that were already described above with respect to body-worn battery B200 of FIGS. 6-7 may be described in lesser detail, or may not be described at all.

In various embodiments, body-worn battery B400 may comprise one or more coupling features configured to releasably couple body-worn battery B400 to mount B104. Body-worn battery B400 may comprise one or more coupling features configured to releasably couple accessory B100 to body-worn battery B400. In this manner, body-worn battery B400 may releasably couple accessory B100 to mount B104, thereby enabling accessory B100 to couple to article of wear B102 via mount B104. In scenarios in which a body-worn battery is not needed, body-worn battery B400 may simply be decoupled from both accessory B100 and mount B104, and accessory B100 may then be directly coupled to mount B104.

Mount 104 may comprise one or more mounting features configured to permanently or releasably couple mount 104 to article of wear B102. For example, mount 104 may comprise mounting feature B160. Mounting feature B160 may be similar to, or share similar aspects, with mounting feature B260 as previously described herein.

In various embodiments, body-worn battery B400 may comprise a first coupling feature, such as first coupling feature B430. First coupling feature B430 may be configured to releasably couple with a second coupling feature of accessory B100, such as second coupling feature B140 as previously described herein. Body-worn battery B400 may comprise a third coupling feature, such as third coupling feature B440. Third coupling feature B440 may complement first coupling feature B140. For example, first coupling feature B430 may comprise one of a male connector (e.g., male connector B144) and a female connector (e.g., female connector B434). Third coupling feature B440 may comprise the other of the male connector and the female connector. Mount B104 may comprise a fourth coupling feature, such as fourth coupling feature B130. Fourth coupling feature B130 may be configured to releasably engage second coupling feature B140 of accessory B100. Fourth coupling feature B130 may be configured to releasably engage third coupling feature B440 of body-worn battery B400. Fourth coupling feature B130 may be similar to first coupling feature B430. Fourth coupling feature B130 may complement second coupling feature B140 and third coupling feature B440. For example, fourth coupling feature B130 may comprise one of a male connector and a female connector. Second coupling feature B140 and third coupling feature B440 may comprise the other of the male connector and the female connector. In this manner, body-worn battery B400 may couple accessory B100 to mount B104 when required, and still allow for accessory B100 to couple to mount B104 when not required. Further, body-worn battery B400 may comprise different coupling features, enabling accessory B100 to couple to mounts having different coupling features. In that regard, body-worn battery B400 may serve as an adapter, rather than a coupler.

Figures 10, 11:
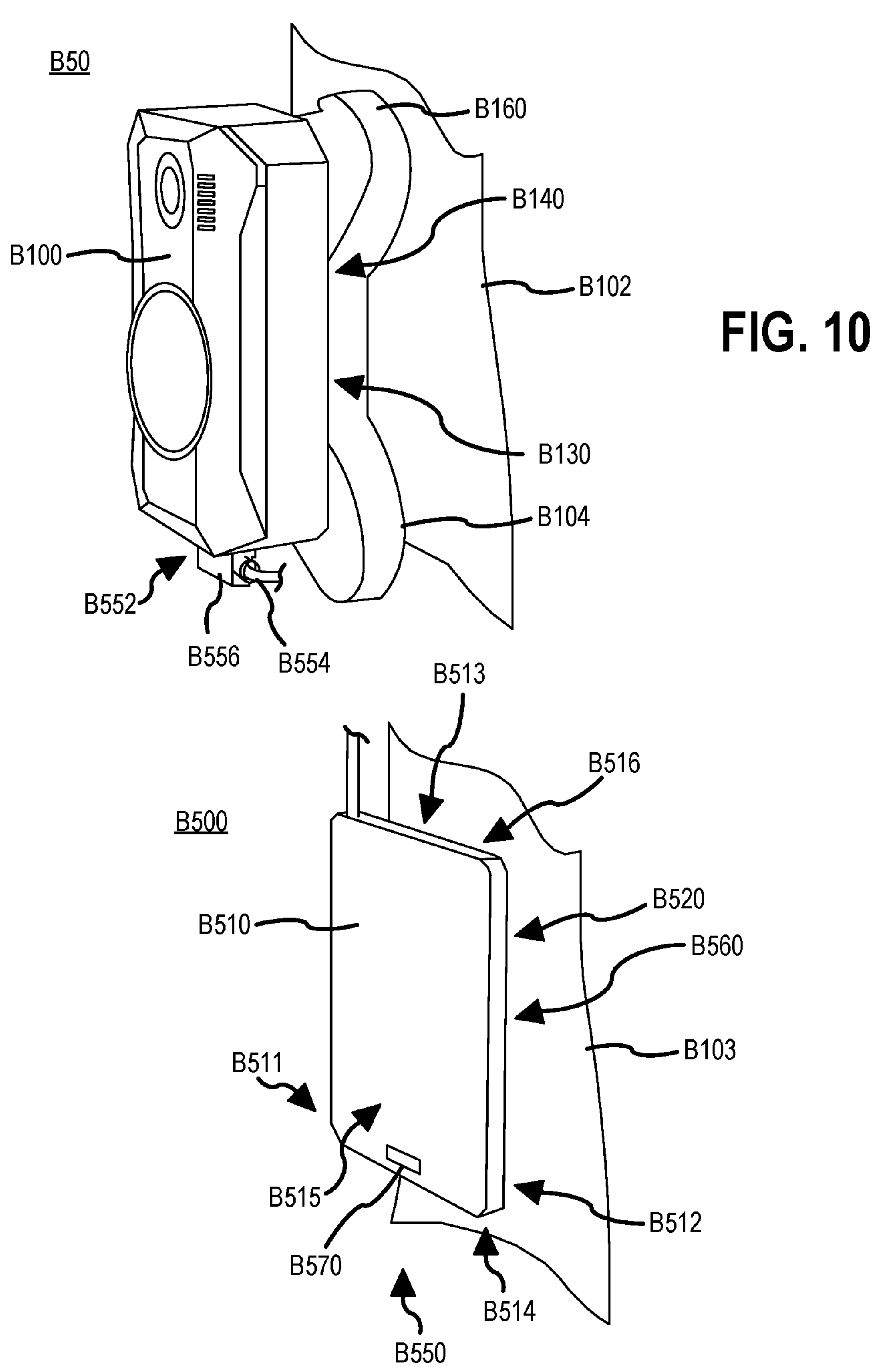
FIG. 10 is a front perspective view showing another implementation of a body-worn battery system, according to some embodiments.
FIG. 11 is a front perspective view showing another implementation of a battery-worn battery and a mount, according to some embodiments.

FIG. 10-11 show perspective views of another implementation of a body-worn battery system, which may be similar to, or share similar aspects or components with the body-worn battery systems previously described herein. It should be understood by one skilled in the art that FIGS. 10-11 are an example illustration of system B50. In the example of FIGS. 10-11, system B50 includes a body-worn battery B500, a mount B104, an accessory B100, an article of wear B102, and another article of wear B103. System B50 may releasably or permanently couple to one or more articles of wear, such as articles of wear B102/103.

For the body-worn battery B500 illustrated in FIGS. 10-11, features are referred to using similar reference numerals under the "B5*xx*" series of reference numerals, rather than "B2*xx*" as used in the body-worn battery embodiments of FIGS. 6-7, or "B4*xx*" as used in the body-worn battery embodiments of FIGS. 8-9. Accordingly, certain features of the body-worn battery B500 that were already described above with respect to body-worn batteries B200/B400 of FIGS. 6-9 may be described in lesser detail, or may not be described at all.

In various embodiments, body-worn battery B500 may be configured to be disposed remote of accessory B100 and mount B104. For example, body-worn battery B500 may be disposed proximate a hip of a user, while accessory B100 and mount B104 are disposed on a chest of a user. It may be preferable to position body-worn battery B500 at an alternate location for increased ergonomics, weight distribution, access to controls, and the like.

In various embodiments, body-worn battery B500 may comprise one or more mounting features configured to permanently or releasably couple body-worn battery B500 to articles of wear B102/B103 (e.g., article, garment, carrier, etc.) as previously described herein. For example, body-worn battery B500 may comprise mounting feature B560, configured to cooperate with articles of wear B102/B103 to releasably or permanently couple body-worn battery B500 to articles of wear B102/B103. Mounting feature B560 may comprise one of a hook and a loop feature configured to releasably engage the other of the hook and the loop feature of articles of wear B102/B103. As another example, mounting feature B560 may comprise a modular lightweight load-carrying equipment (MOLLE) mount configured to releasably engage a strap (e.g., MOLLE strap) of articles of wear B102/B103. As yet another example, mounting feature B2560 may comprise one or more ferromagnetic and/or ferrimagnetic materials configured to releasably engage one or more ferromagnetic and/or ferrimagnetic materials disposed on an inner surface of article articles of wear B102/B103.

In some embodiments, mounting feature B560 may be configured to permanently couple body-worn battery B500 to articles of wear B102/B103. For example, mounting feature B560 may comprise a pad configured to be stitched directly to articles of wear B102/B103. As another example, mounting feature B560 may comprise an adhesive, such as an iron-on adhesive, configured to permanently couple body-worn battery B500 to articles of wear B102/B103.

In various embodiments, body-worn battery B500 may comprise an electrical interface, sharing similar properties, or aspects with, the electrical interfaces described previously herein (e.g., interface B250/B450). For example, body-worn battery B500 may comprise one or more terminals configured to provide and/or receive power to and/or from body-worn battery B500. The one or more terminals may be configured to enable charging and/or discharging of body-worn battery B500. For example, system B50 may comprise a terminal B556. Terminal B556 may comprise a male terminal or a female terminal. Terminal B556 may be coupled to body-worn battery B500 via a cable, such as cable B554. In some embodiments, cable B554 may be releasably coupled with body-worn battery B500 via another terminal integrated with body B210 of body-worn battery B550.

In various embodiments, cable B554 may be configured to transmit power from power supply B520 of body-worn battery B500. Cable B554 may be configured to extend between body-worn battery B50 and accessory B100. Cable B554 may comprise a cable having a configurable length. For example, cable B554 may comprise a coiled spring cable. As another example, cable B554 may comprise a retractable cable. In that regard, an unused length of cable B554 may releasably retract into one of the body of accessory B100 or body B510 of body-worn battery B500. As yet another example, body B510 may comprise one or more mechanical features enabling an unused length of cable B554 to be wrapped (e.g., spooled) around body B510. A cable having a configurable length may be advantageous when body-worn battery B200 is worn at a location different than the location of accessory B100.

CONCLUSION

In various embodiments, a computer-based system may be appropriate for use in accordance with various recording device embodiments of the present disclosure. The accompanying description of a computer-based system may be applicable to servers, personal computers, mobile phones, smart phones, tablet computers, embedded computing devices, and other currently available or yet-to-be-developed devices that may be used in accordance with embodiments of the present disclosure.

A computer-based system may include a processor and a system memory connected by a communication bus. Depending on the exact configuration and type of computer-based system, system memory may be volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor. In this regard, the processor may serve as a computational center of the computer-based system by supporting the execution of instructions. The processor may comprise one or more processing units, as discussed further herein. The system memory may comprise one or more memory units, as discussed further herein.

A computer-based system may include a network interface comprising one or more components for communicating with other devices and systems over a network. Embodiments of the present disclosure may access basic services that utilize the network interface to perform communications using common network protocols. The network interface may comprise a communications unit, as discussed further herein.

A computer-based system may also include a storage medium. However, services may be accessed using a computer-based system that does not include means for persisting data to a local storage medium. Therefore, the storage medium may be optional. The storage medium may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 608 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data.

A computer-based system may include input devices, such as a keyboard, keypad, mouse, trackball, microphone, video camera, touchpad, touchscreen, electronic pen, stylus, and/or any other input device described herein. Such input devices may be coupled to the computer-based system by wired or wireless connections including RF, infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to a computer-based system (e.g., a client device), or can be integral components of a computer-based system. In some embodiments, multiple input devices may be combined into a single, multifunction input device (e.g., a video camera with an integrated microphone).

A computer-based system may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to the computer-based system, or can be integral components of the computer-based system. Input functionality and output functionality may be integrated into the same input/output device (e.g., a touchscreen). Any suitable input device, output device, or combined input/output device either currently known or developed in the future may be used with described systems.

In various embodiments, a “processing unit” as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a “communications unit” as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term “network” may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MDS, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a “memory unit” as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein, unless specified otherwise, may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an “input device” as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an “output device” as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below. Where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

No claim element is intended to invoke 35 U.S.C. 112(*f*) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The words "herein", "hereunder", "above", "below", and other word that refer to a location, whether specific or general, in the specification shall refer to any location in the specification.

What is claimed is:

1. A body-worn battery comprising:

a housing comprising a first surface and a second surface, the first surface opposite the second surface;

a battery disposed within the housing;

a battery interface in electrical communication with the battery;

a first coupling feature adjacent to the first surface of the housing, the first coupling feature configured to releasably couple to an accessory; and one of a second coupling feature or a first mounting feature adjacent to the second surface of the housing, wherein:

the battery interface transfers power from the battery disposed within the housing to recharge the accessory when the battery interface is disposed in electrical communication with the accessory;

the one of the second coupling feature or the first mounting feature is configured to cooperate with an article of wear to releasably or permanently couple the housing to the article of wear; and the housing is disposed between the accessory and the article of wear when the first coupling feature adjacent to the first surface of the housing is releasably coupled to the accessory and the one of the second coupling feature or the first mounting feature adjacent to the second surface of the housing opposite the first surface of the housing is coupled to the article of wear.

2. The body-worn battery of claim 1, wherein coupling of the first coupling feature to the accessory establishes an electrical connection between the battery and the accessory via the battery interface.

3. The body-worn battery of claim 2, wherein:

the battery interface comprises a terminal; and coupling the first coupling feature to the accessory is configured to engage the terminal with the accessory to establish a wired electrical connection between the battery and the accessory.

4. The body-worn battery of claim 2, wherein:

the battery interface comprises an inductive coil; and coupling the first coupling feature to the accessory is configured to engage the inductive coil with the accessory to establish a wireless electrical connection between the battery and the accessory.

5. The body-worn battery of claim 1, wherein the battery interface comprises a cable, and wherein the cable is configured to couple the battery to the accessory.

6. The body-worn battery of claim 1, wherein the body-worn battery comprises the second coupling feature and the second coupling feature is configured to couple the housing to a mount to couple the accessory to the mount.

7. The body-worn battery of claim 1, wherein the body-worn battery comprises the first mounting feature and the first mounting feature is configured to mount the housing to the article of wear to mount the accessory to the article of wear.

8. The body-worn battery of claim 1, wherein the body-worn battery comprises the first mounting feature and the first mounting feature is configured to permanently couple the housing to the article of wear, and wherein the battery is a removable battery.

9. The body-worn battery of claim 1, wherein the battery interface is configured to provide indicia associated with a state of charge of the battery to the accessory.

10. The body-worn battery of claim 1, wherein the battery interface comprises a coiled spring cable.

11. The body-worn battery of claim 10, wherein an unused length of the coiled spring cable is configured to releasably retract into the housing.

12. The body-worn battery of claim 1, wherein the accessory is a recording device.

13. The body-worn battery of claim 1, wherein the housing of the body-worn battery comprises a rectangular shape.

14. The body-worn battery of claim 1, wherein:

the body-worn battery comprises the second coupling feature;

the second coupling feature of the body-worn battery comprises one of a male connector or a female connector; and the first coupling feature of the body-worn battery comprises the other of the male connector or the female connector different from the second coupling feature.

15. A recording system comprising:

a recording device comprising:

a camera configured to capture an image;

a receiving interface;

a first coupling feature; and a communications interface;

a body-worn battery comprising:

a housing comprising a first surface and a second surface, the first surface opposite the second surface;

a battery disposed within the housing;

a battery interface in electrical communication with the battery;

a second coupling feature adjacent to the first surface of the housing, the second coupling feature configured to releasably couple to the first coupling feature of the recording device; and a third coupling feature, wherein the battery interface transfers power from the battery disposed within the housing of the body-worn battery to recharge the recording device via the receiving interface of the recording device; and a mount comprising a fourth coupling feature and one or more mounting features, wherein:

the one or more mounting features are configured to permanently or releasably couple the mount to an article of wear;

the housing of the body-worn battery couples the recording device to the mount when the second coupling feature of the body-worn battery is coupled to the first coupling feature of the recording device;

the mount couples the body-worn battery to the article of wear when the third coupling feature of the body-worn battery is coupled to the fourth coupling feature of the mount and the one or more mounting features are coupled to the article of wear.

16. The recording system of claim 15, wherein coupling of the second coupling feature of the body-worn battery to the first coupling feature of the recording device establishes an electrical connection between the battery and the recording device via the battery interface.

17. The recording system of claim 16, wherein:

the battery interface comprises a terminal; and coupling the second coupling feature of the body-worn battery to the first coupling feature of the recording device is configured to engage the terminal with the recording device to establish a wired electrical connection between the battery and the recording device.

18. The recording system of claim 16, wherein:

the battery interface comprises an inductive coil; and coupling the second coupling feature of the body-worn battery to the first coupling feature of the recording device is configured to engage the inductive coil with the recording device to establish a wireless electrical connection between the battery and the recording device.

19. The recording system of claim 15, wherein the fourth coupling feature of the mount is configured to interchangeably couple to each of the first coupling feature of the recording device and the third coupling feature of the body-worn battery.

20. The recording system of claim 15, wherein:

the third coupling feature is disposed on the second surface of the housing of the body-worn battery;

the first surface of the housing of the body-worn battery is disposed opposite the second surface of the housing of the body-worn battery; and the body-worn battery is disposed between the recording device and the article of wear when the first coupling feature of the recording device is coupled to the second coupling feature of the body-worn battery and the third coupling feature is coupled to the fourth coupling feature of the mount.

* * * * *